(12) United States Patent
Yoshida et al.

(10) Patent No.: US 8,847,457 B2
(45) Date of Patent: Sep. 30, 2014

(54) ROTARY ELECTRIC MACHINE AND METHOD OF MANUFACTURING SAME

(75) Inventors: Takashi Yoshida, Kazo (JP); Satoru Uchiumi, Tsu (JP); Hiroki Tahira, Utsunomiya (JP); Kohei Fujinoto, Utsunomiya (JP); Masahiko Kamiyama, Kanuma (JP); Kenji Kitamura, Utsunomiya (JP); Takashi Nakayama, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 360 days.

(21) Appl. No.: 13/449,394

(22) Filed: Apr. 18, 2012

(65) Prior Publication Data

US 2012/0267979 A1  Oct. 25, 2012

(30) Foreign Application Priority Data

Apr. 22, 2011  (JP) ................................. 2011-096398
Apr. 22, 2011  (JP) ................................. 2011-096400

(51) Int. Cl.
  *H02K 1/00*  (2006.01)
(52) U.S. Cl.
  USPC ............................................ 310/194; 29/596
(58) Field of Classification Search
  USPC .............................. 310/194, 214, 215; 29/596
  See application file for complete search history.

(56) References Cited

U.S. PATENT DOCUMENTS

| | | | |
|---|---|---|---|
| 7,253,547 B2 * | 8/2007 | Shin et al. ..................... 310/194 |
| 7,560,839 B2 * | 7/2009 | Sumiya et al. .................. 310/71 |
| 7,569,958 B2 | 8/2009 | Matsuzaki et al. | |
| 7,626,303 B2 * | 12/2009 | Watanabe et al. ...... 310/216.095 |
| 8,497,618 B2 * | 7/2013 | Kato ............................. 310/215 |

FOREIGN PATENT DOCUMENTS

| | | |
|---|---|---|
| CN | 101286657 | 10/2008 |
| JP | 2000-217293 | 8/2000 |

OTHER PUBLICATIONS

Chinese Office Action and partial English translation dated Jan. 27, 2014, Application No. 201210119173.6, 6 pages.

* cited by examiner

*Primary Examiner* — Hanh Nguyen
(74) *Attorney, Agent, or Firm* — Rankin, Hill & Clark LLP

(57) ABSTRACT

A rotary electric machine includes a plurality of lead end holding grooves defined in insulators at an outer circumferential surface of a stator core, for guiding respective ends of coil leads therein. The lead end holding grooves are defined by ledges of the insulators. The ledges have respective lands which are convex in widthwise directions of the lead end holding groove.

10 Claims, 19 Drawing Sheets

US 8,847,457 B2

ROTARY ELECTRIC MACHINE AND METHOD OF MANUFACTURING SAME

CROSS-REFERENCE TO RELATED APPLICATION

This application is based upon and claims the benefit of priority from Japanese Patent Applications No. 2011-096398 filed on Apr. 22, 2011 and No. 2011-096400 filed on Apr. 22, 2011, of which the contents are incorporated herein by reference.

BACKGROUND OF THE INVENTION

1. Field of the Invention

The present invention relates to a rotary electric machine including a stator core having an annular assembly of plural divided core members, and a method of manufacturing the same.

2. Description of the Related Art

Heretofore, stators for use in rotary electric machines include an annular array of plural divided core members each having a divided iron core, an insulator surrounding a portion of the divided iron core, and coil leads wound on the divided iron core with the insulator interposed therebetween.

Japanese Laid-Open Patent Publication No. 2000-217293 discloses a rotary electric machine stator including an insulator which has recesses (lead end holding grooves) defined therein circumferentially along an outer circumferential surface thereof. Coil leads wound on the insulator have ends placed in the lead end holding grooves and extending to positions where they are connected to power feed lines.

SUMMARY OF THE INVENTION

With the stator disclosed in Japanese Laid-Open Patent Publication No. 2000-217293, however, unless the lead end holding grooves are fabricated to a nicety, the ends of the coil ends rub against the walls of the lead end holding grooves because of vibrations when the rotary electric machine operates, tending to break insulation coverings of the coil leads.

It is an object of the present invention to provide a rotary electric machine including coil leads whose ends are securely held in lead end holding grooves despite vibrations caused when the rotary electric machine operates, and a method of manufacturing such a rotary electric machine.

To achieve the above object, there is provided in accordance with one aspect of the present invention a rotary electric machine comprising a stator having a stator core constructed of an annular array of divided core members, wherein each of the divided core members includes a divided iron core, an insulator surrounding a portion of the divided iron core, and a coil lead wound on the divided iron core with the insulator interposed therebetween, the insulator has a lead end holding groove defined therein at an outer circumferential surface of the stator core, for guiding an end of the coil lead therein, the lead end holding groove extending in circumferential directions of the stator core, and the end of the coil lead is placed in an undulating shape along the circumferential directions within the lead end holding groove.

With the above arrangement, as the ends of the coil leads are placed in the undulating shape along the circumferential directions within the lead end holding grooves, peaks or valleys of the ends of the coil leads are held in close contact with the ledges that define the lead end holding grooves. Thus, the ends of the coil leads are pressed against, i.e., apply stresses to, the ledges. Therefore, the ends of the coil leads which have been guided in the lead end holding grooves are securely retained on the ledges.

When a rotary electric machine incorporating the stator wherein the guided ends of the coil leads are placed in the lead end holding grooves is in operation, since the guided ends of the coil leads are retained in position under stresses that act from the peaks or valleys on the ledges, the ends of the coil leads are prevented from rubbing against the ledges and hence, e.g., from breaking their insulation coverings despite vibrations of the rotary electric machine.

As the peaks or valleys are retained on the ledges, the areas of contact between the ends of the coil leads and the ledges are increased, and hence the surface pressure therebetween is reduced. Consequently, the ends of the coil leads are prevented from being scraped off when the rotary electric machine vibrates during operation.

According to the present invention, therefore, when the rotary electric machine vibrates during operation, the ends of the coil leads are securely held in the lead end holding grooves.

Further, it is preferable that the lead end holding groove is defined by ledges, one of the ledges having a land which is convex in widthwise directions of the lead end holding groove.

With the above arrangement, when the ends of the coil leads are placed in the lead end holding grooves, portions of the ends of the coil leads which correspond to the lands are deformed or bent along the lands. As a result, after the ends of the coil leads are placed in the lead end holding grooves, the deformed or bent portions of the ends of the coil leads undergo reactive forces tending to cause themselves to spring back toward the lands. Under the reactive forces, the deformed or bent portions are securely retained on the lands.

When a rotary electric machine incorporating the stator wherein the guided ends of the coil leads are placed in the lead end holding grooves is in operation, since the deformed portions of the guided ends of the coil leads are securely retained on the lands under the reactive forces, the ends of the coil leads are prevented from rubbing against the ledges and hence, e.g., from breaking their insulation coverings despite vibrations of the rotary electric machine.

As the deformed portions of the ends of the coil leads are retained on the lands, the areas of contact between the ends of the coil leads and the ledges are increased, and hence the surface pressure therebetween is reduced. Consequently, the ends of the coil leads are prevented from being scraped off when the rotary electric machine vibrates during operation.

Accordingly, even in the structure having the lands, when the rotary electric machine vibrates during operation, the ends of the coil leads are securely held in the lead end holding grooves.

One lead end holding groove may be defined between two ledges, and one of the two ledges may have the land in the widthwise directions. Another lead end holding groove, which is circumferentially adjacent to the one lead end holding groove, may be defined between two ledges, and the other of the two ledges may have another land in the widthwise directions.

The lands are alternately disposed on the ledges along the circumferential directions of the stator core. Consequently, the ends of the coil leads are housed in the lead end holding grooves in an undulating shape along the circumferential directions of the stator core. As a result, the ends of the coil leads and the ledges are reliably prevented from rubbing against each other despite vibrations that are caused when the rotary electric machine is in operation.

Two lead end holding grooves may be defined in the circumferential directions in the insulator. With this arrangement, since the ends of the coil leads placed in the lead end holding grooves have an increased number of portions deformed along the lands, the ends of the coil leads are securely held in the lead end holding grooves.

Another of the ledges may have a recess which is concave in the widthwise directions, and the recess may face the land. With this arrangement, the ends of the coil leads can easily be deformed into an undulating shape along the lands and the recesses. As the deformed portions of the ends of the coil leads are held by the lands and the recesses, the areas of contact between the ends of the coil leads and the ledges are increased, and hence the surface pressure therebetween is reduced. Consequently, the ends of the coil leads are reliably prevented from being scraped off when the rotary electric machine vibrates during operation.

The land and the recess may extend in depthwise directions of the lead end holding groove. With this arrangement, when the ends of the coil leads that are wound on the divided icon cores of the respective divided core members are guided into the lead end holding grooves, the ends of all the coil leads that are guided can be deformed into an undulating shape along the lands and the recesses.

If it is assumed that the land has a height w1 from the ledge, the end of the coil lead has a width w2, and the lead end holding groove has a width w3, then the width w1 may be established to satisfy the relationship:

$$w1<(w3-w2)<(2\times w1).$$

With this arrangement, the ends of the coil leads are placed in the lead end holding grooves without rubbing against the ledges, and can easily be deformed into an undulating shape by contact with the lands.

The coil lead may comprise a flat wire having a rectangular cross-sectional shape, and the end of the coil lead may be guided in the lead end holding groove such that a longer side of the rectangular cross section lies along the widthwise directions of the lead end holding groove. With this arrangement, the ends of the coil leads undergo greater reactive forces tending to cause themselves to spring back toward the lands than if the shorter side of the flat wire lies along the widthwise directions of the lead end holding groove.

Further, in the structure having no land on the ledges according to the present invention, the ends of the coil leads may be housed in the lead end holding grooves as follows.

That is, the lead end holding groove may be defined by ledges of the insulator, and the end of the coil lead may be processed into the undulating shape along the circumferential directions before being guided in the lead end holding groove, whereby the end of the coil lead is held in abutment against the ledges when placed in the lead end holding groove. Inasmuch as the peaks and the valleys are alternately held in abutment against the ledges along the circumferential directions of the stator core, the ends of the coil leads are prevented from rubbing against the ledges despite vibrations of the rotary electric machine. The areas of contact between the ends of the coil leads and the ledges are increased, and hence the surface pressure therebetween is reduced. Consequently, the ends of the coil leads are prevented from being scraped off when the rotary electric machine vibrates during operation.

The two lead end holding grooves may be defined in the circumferential directions in the insulator. With this arrangement, since the ends of the coil leads placed in the lead end holding grooves have an increased number of portions held in abutment against the ledges, the ends of the coil leads are securely held in the lead end holding grooves.

Even in the structure having no land on the ledges which define each of the lead end holding grooves, each of the coil leads may comprise a flat wire having a rectangular cross-sectional shape, and the end of the coil lead may be guided in the lead end holding groove such that a longer side of the rectangular cross section lies along the widthwise directions of the lead end holding groove. With this arrangement, more stresses are applied to the ledges than if the shorter side of the flat wire lies along the widthwise directions of the lead end holding groove. The ends of the coil leads are thus more effectively retained on the ledges.

According to the another aspect of the present invention, there is further provided a method of manufacturing a rotary electric machine including a stator having a stator core constructed of an annular array of divided core members, comprising the steps of fitting an insulator over a divided iron core in surrounding relation to a portion of the divided iron core, constructing the divided core member by winding a coil lead on the divided iron core with the insulator interposed therebetween, producing the stator core by arranging a plurality of the divided core members in the annular array, processing an end of the coil lead into an undulating shape along longitudinal directions of the coil lead, and housing the undulating ends of coil leads in lead end holding grooves defined in the insulators at an outer circumferential surface of the stator core and extending in circumferential directions of the stator core.

According to the above method, as the ends of the coil leads are placed while they are formed in the undulating shape along the circumferential directions within the lead end holding grooves, peaks or valleys of the ends of the coil leads are held in close contact with the ledges that define the lead end holding grooves. Thus, the ends of the coil leads are pressed against, i.e., apply stresses to, the ledges. Therefore, the ends of the coil leads are securely retained on the ledges.

When a rotary electric machine incorporating the stator wherein the guided ends of the coil leads are placed in the lead end holding grooves is in operation, since the guided ends of the coil leads are retained in position under stresses that act from the peaks or valleys on the ledges, the ends of the coil leads are prevented from rubbing against the ledges and hence, e.g., from breaking their insulation coverings despite vibrations of the rotary electric machine.

As the peaks or valleys are retained on the ledges, the areas of contact between the ends of the coil leads and the ledges are increased, and hence the surface pressure therebetween is reduced. Consequently, the ends of the coil leads are prevented from being scraped off when the rotary electric machine vibrates during operation.

According to this aspect of the present invention, therefore, when the rotary electric machine vibrates during operation, the ends of the coil leads are securely held in the lead end holding grooves.

According to another aspect of the present invention, there is further provided another method of manufacturing a rotary electric machine including a stator having a stator core constructed of an annular array of divided core members, comprising the steps of fitting an insulator over a divided iron core in surrounding relation to a portion of the divided iron core, constructing the divided core member by winding a coil lead on the divided iron core with the insulator interposed therebetween, producing the stator core by arranging a plurality of the divided core members in the annular array, housing ends of coil leads in lead end holding grooves defined in the insulators at an outer circumferential surface of the stator core and extending in circumferential directions of the stator core, and processing the ends of the coil ends into an undulating shape along the circumferential directions of the stator core by displacing at least one of adjacent two of the divided core members along an axial direction of the stator core.

According to the above method, at least one of adjacent two of the divided core members is displaced along an axial direction of the stator core to process the ends of the coil ends into an undulating shape along the circumferential directions of the stator core. Since the ends of the coil leads are placed while they are formed in the undulating shape along the circumferential directions within the lead end holding grooves, the method offers the same advantages as the above-mentioned method.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Rotary electric machines according to first and second embodiments of the present invention, in relation to stators to be incorporated therein, will be described in detail below with reference to the accompanying drawings.

Figure 1:
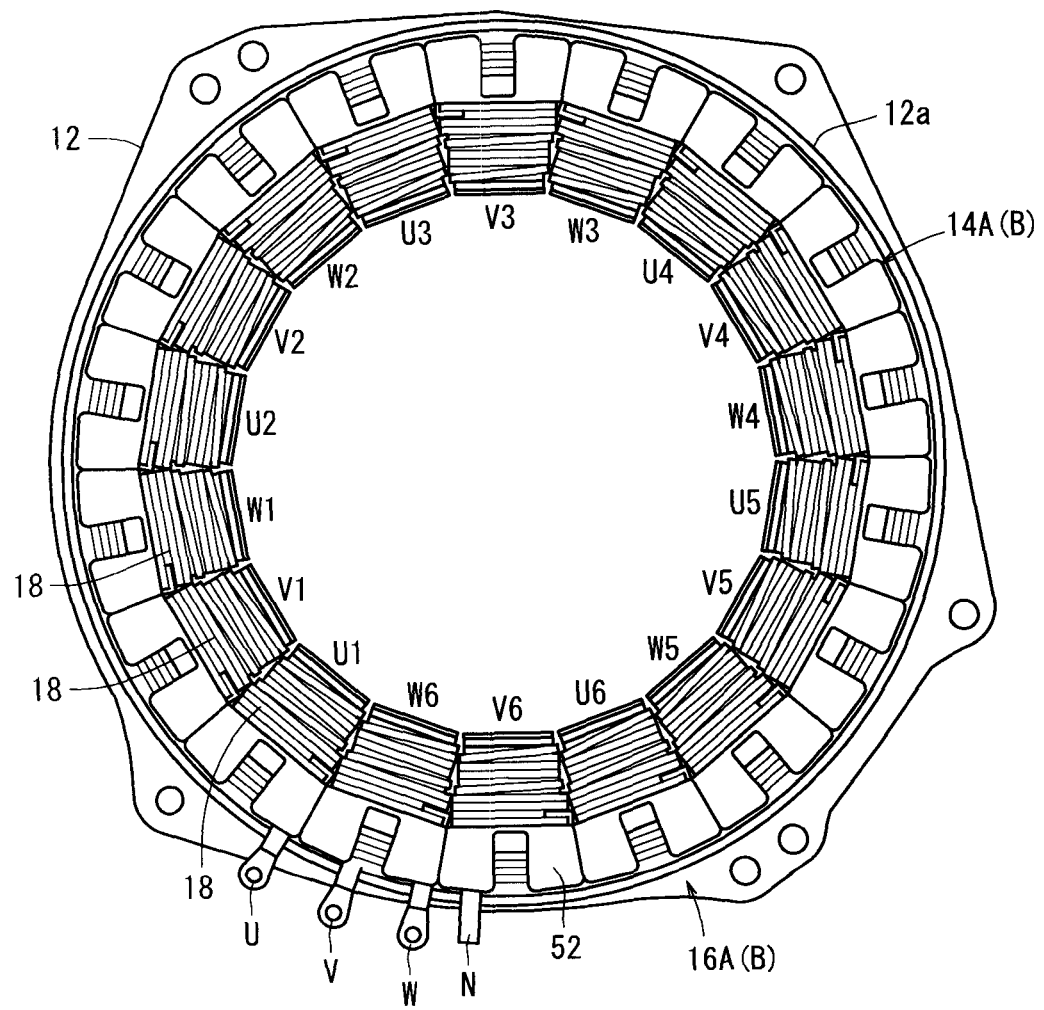
FIG. 1 is a plan view of stators for use in rotary electric machines according to first and second embodiments of the present invention.

FIG. 1 shows in plan stators 10A, 10B for use in rotary electric machines according to first and second embodiments of the present invention. Major components of the stator 10A according to the first embodiment will be denoted by reference numerals with a suffix "A", and major components of the stator 10B according to the second embodiment will be denoted by reference numerals with a suffix "B". Identical components according to the first and second embodiments will be denoted by identical reference numerals.

Each of the stators 10A, 10B is combined with a rotor, not shown, disposed therein, making up a rotary electric machine which will be used as an electric motor or generator.

Each of the stators 10A, 10B is a three-phase Y-connected salient-pole stator. As shown in FIG. 1, each of the stators 10A, 10B includes a hollow holder 12, three-phase input terminals U, V, W mounted on the hollow holder 12, a neutral terminal N mounted on the hollow holder 12 as providing a neutral point, and a stator core 16A/16B having an annular assembly of plural (18 in FIG. 1) divided core members 14A/14B disposed along an inner circumferential surface 12a of the holder 12.

Specifically, the stator core 16A/16B includes three groups of six divided core members 14A/14B, each group supporting coils 18 in U-, V-, W-phases on the corresponding divided core members 14A/14B. The divided core members 14A/14B are arranged in an annular pattern along the inner circumferential surface 12a of the holder 12 such that the coils 18 in U-, V-, W-phases (U1- through U6-phases, V1- through V6-phases, W1- through W6-phases) are successively arrayed in a sequence of U1, V1, W1, U2, . . . , U6, V6, W6), clockwise in FIG. 1.

The stators 10A, 10B according to the first and second embodiments are basically constructed as described above. The stators 10A, 10B according to the first and second embodiments will be described in greater detail below.

First, details of the stator 10A according to the first embodiment will be described below.

One of the divided core members 14A supporting the respective coils in U1- through U6-phases, V1- through V6-phases, W1- through W6-phases will be described below with reference to FIGS. 2 through 8B. The divided core member 14A to be described below is structurally identical to the other divided core members 14A in all phases.

Figure 2:
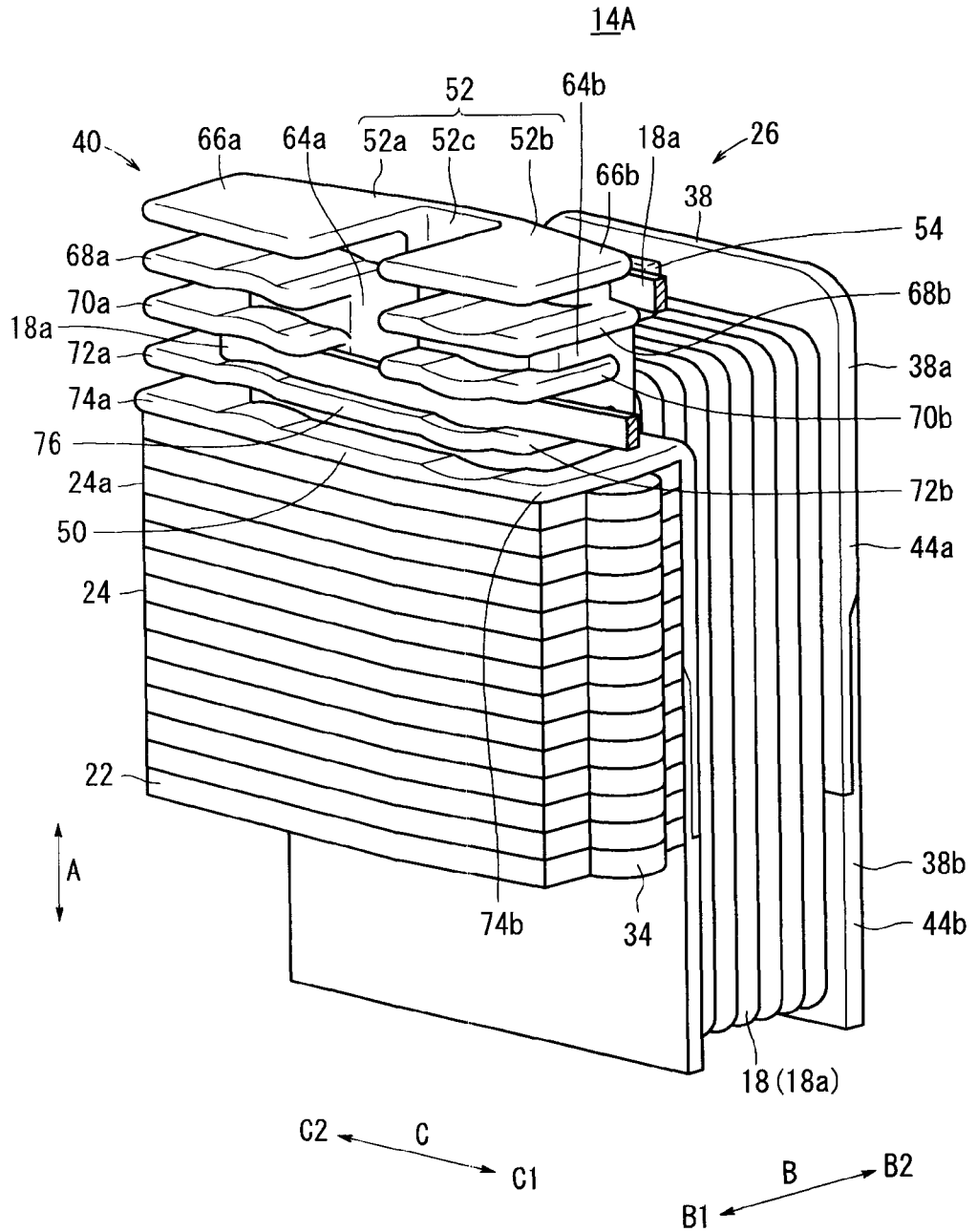
FIG. 2 is a perspective view of a divided core member according to the first embodiment.
Figure 3:
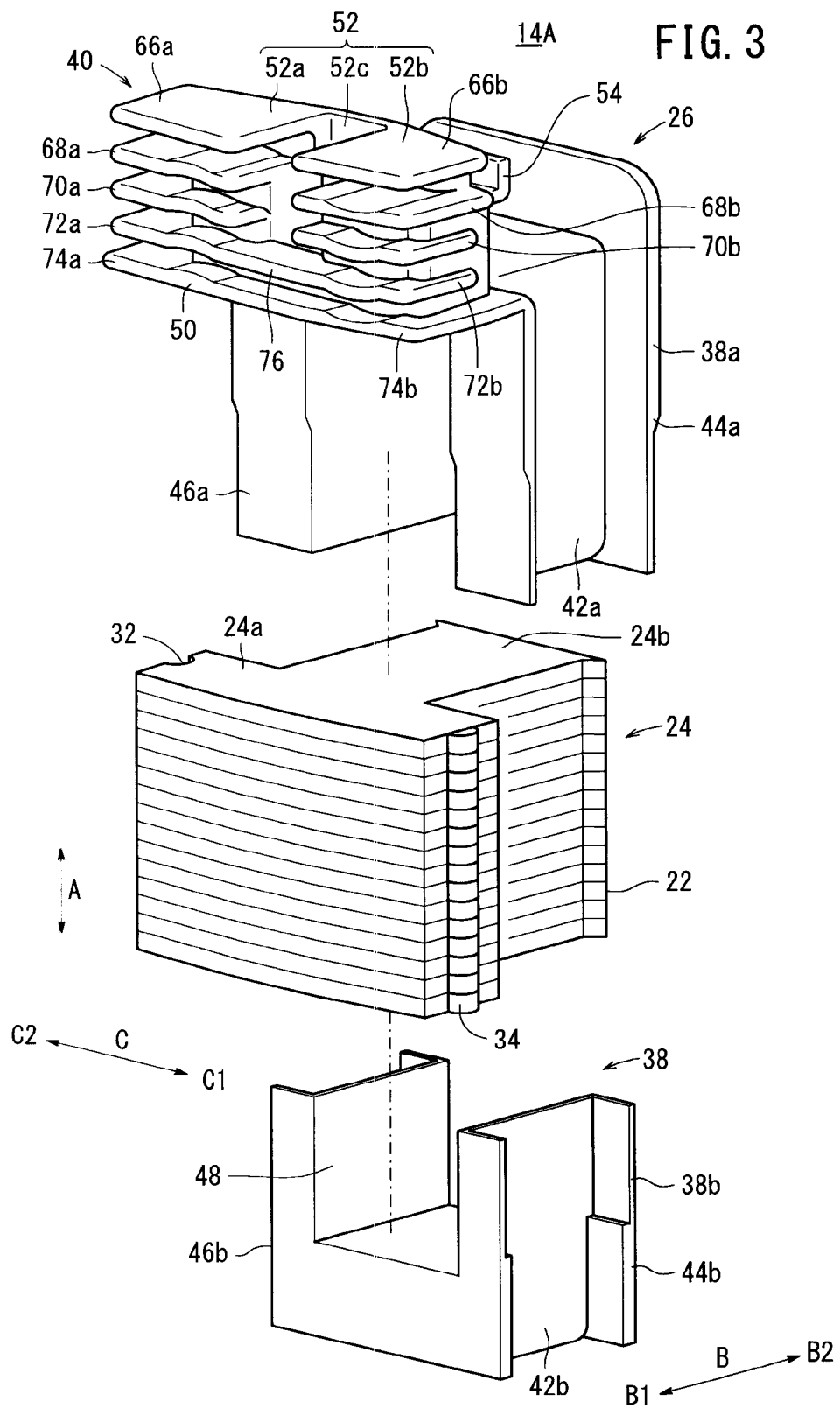
FIG. 3 is an exploded perspective view of the divided core member shown in FIG. 2.

As shown in FIGS. 1 through 3, the divided core member 14A includes a divided iron core 24 made up of a plurality of substantially T-shaped stacked metal plates (steel plates) 22 blanked to shape by a press, an insulator 26 which electrically insulates the divided iron core 24, and a coil 18 which comprises a coil strand (coil lead) 18a wound on the divided iron core 24 with the insulator 26 interposed therebetween. The coil strand 18a is in the form of a flat wire having a rectangular cross-sectional shape.

The divided iron core 24 which is substantially T-shaped includes a yoke 24a disposed on an end thereof in the direction of the arrow B1, i.e., in the outward direction of the stator core 16A (see FIG. 1) and extending along the direction indicated by the arrow C, i.e., along the circumferential directions of the stator core 16A, and a magnetic pole 24b extending from the yoke 24a along the direction indicated by the arrow B2, i.e., in the inward direction of the stator core 16A. The yoke 24a has a substantially semicircular recess 32 defined in an end thereof in the direction indicated by the arrow C2, and a substantially semicircular tooth 34 disposed on an end thereof in the direction indicated by the arrow C1. The tooth 34 fits in the recess 32 of the adjacent yoke 24a of an adjacent divided iron core 24.

The insulator 26 is made of an electrically insulating material such as flexible resins or plastics. The insulator 26 includes a coil frame 38 for winding the coil strand 18a thereon and a guide 40 projecting from the coil frame 38 along the direction indicated by the arrow B1, for guiding ends (a beginning end and a terminating end) of the coil strand 18a along the directions indicated by the arrow C to the positions of the input terminals U, V, W and the neutral terminal N.

The coil frame 38 includes an upper coil frame member 38a and a lower coil frame member 38b which are fitted together along the directions indicated by the arrows A, i.e., along the vertical directions.

The upper coil frame member 38a includes an upper winder body 42a having a substantially U-shaped cross section, an upper inner circumferential wall 44a mounted on an end of the upper winder body 42a in the direction indicated by the arrow B2, and an upper outer circumferential wall 46a mounted on an end of the upper winder body 42a in the direction indicated by the arrow B1 in facing relation to the upper inner circumferential wall 44a.

The lower coil frame member 38b includes a lower winder body 42b having a substantially U-shaped cross section in facing relation to the upper winder body 42a, a lower inner circumferential wall 44b mounted on an end of the lower winder body 42b in the direction indicated by the arrow B2 in facing relation to the upper inner circumferential wall 44a, and a lower outer circumferential wall 46b mounted on an end of the lower winder body 42b in the direction indicated by the arrow B1 in facing relation to the lower inner circumferential wall 44b.

When the upper coil frame member 38a and the lower coil frame member 38b are fitted together in sandwiching relation to the magnetic pole 24b of the divided iron core 24, the upper winder body 42a and the lower winder body 42b, the upper inner circumferential wall 44a and the lower inner circumferential wall 44b, the upper outer circumferential wall 46a and the lower outer circumferential wall 46b are partly superposed one on the other and joined to each other. Specifically, the lower coil frame member 38b is inserted upwardly into the upper coil frame member 38a, so that the upper coil frame member 38a and the lower coil frame member 38b are integrally combined together into the coil frame 38, with a hole 48 defined centrally therein which extends along the directions indicated by the arrows B. The magnetic pole 24b is fitted in the hole 48, and the coil strand 18a is wound between the upper inner circumferential wall 44a and the lower inner circumferential wall 44b and between the upper outer circumferential wall 46a and the lower outer circumferential wall 46b, providing the coil 18 on the coil frame 38.

The guide 40 projects along the direction indicated by the arrow B1 from an upper end of the upper outer circumferential wall 46a.

The guide 40 includes a plate member 50, a lead holder 52 which is substantially U-shaped as viewed in plan in FIG. 1, and a terminating end retainer 54 for retaining the terminating end of the coil strand 18a wound on the coil frame 38, the terminating end retainer 54 being disposed behind the lead holder 52 in the direction indicated by the arrow B2 at an end of the lead holder 52 in the direction indicated by the arrow C1.

The lead holder 52 serves to hold beginning ends or terminating ends of coil strands 18a wound on the coil frame 38, along the directions indicated by the arrow C.

Figure 4:
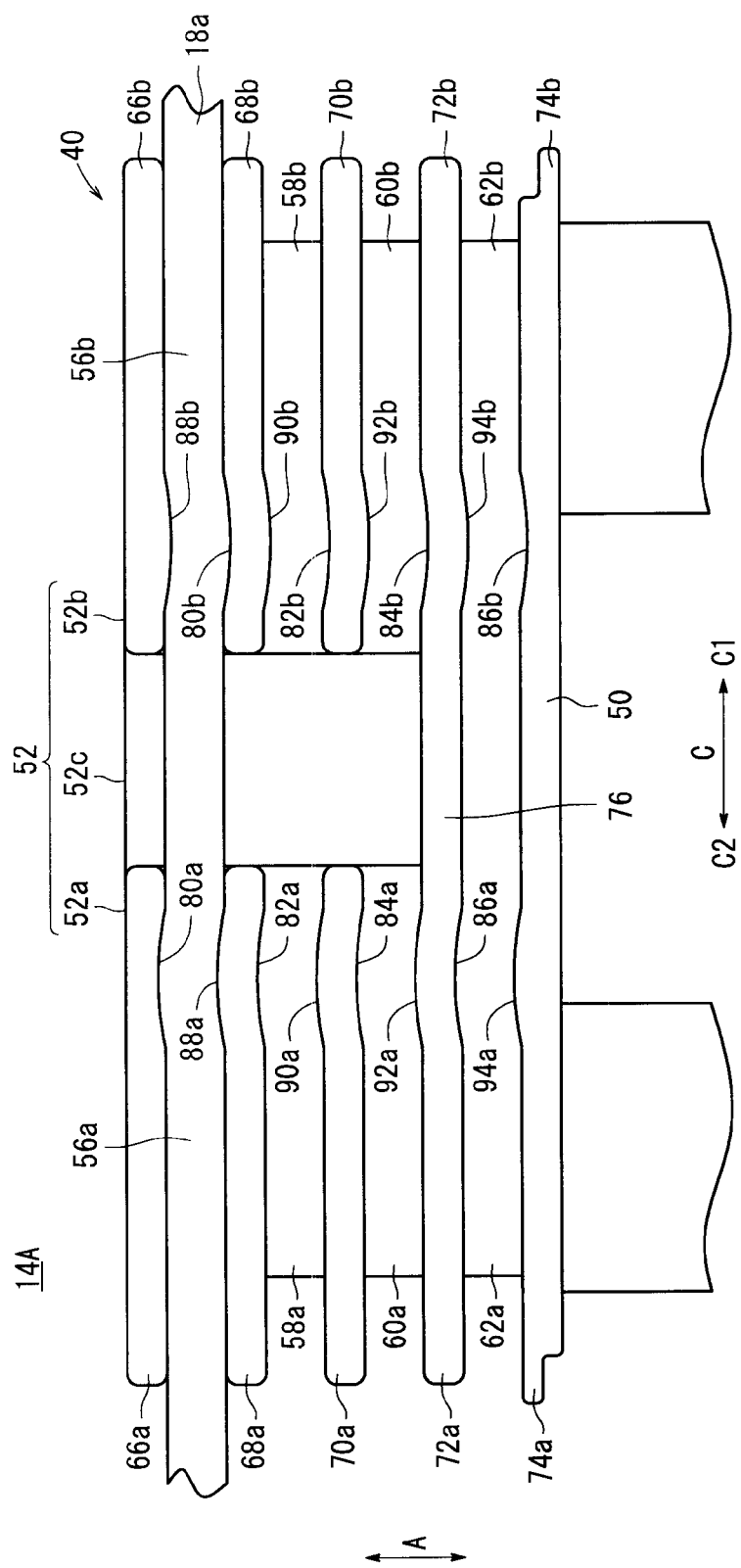
FIG. 4 is a fragmentary front elevational view of an insulator shown in FIG. 2.
Figure 5:
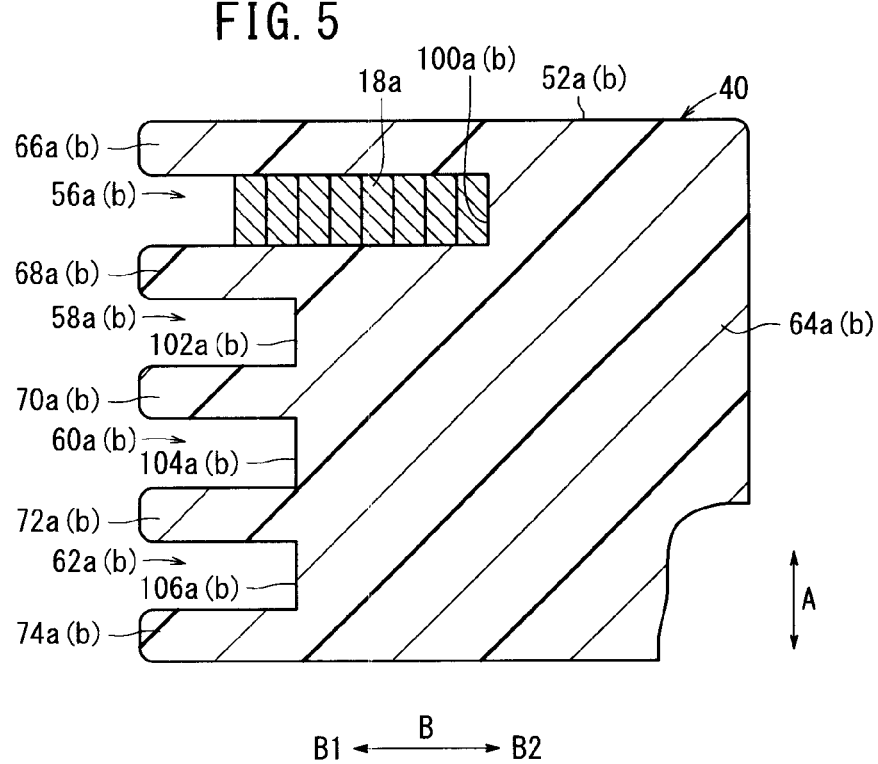
FIG. 5 is a fragmentary cross-sectional view of the insulator shown in FIG. 2.

Specifically, the lead holder 52 includes blocks 52a, 52b mounted on respective sides of the plate member 50 which are spaced from each other along the respective directions indicated by the arrows C2, C1, and a joint 52c interconnecting respective rear ends of the blocks 52a, 52b along the direction indicated by the arrow B2. As shown in FIGS. 4 and 5, the block 52a has a plurality of lead end holding grooves 56a, 58a, 60a, 62a defined therein which are spaced by predetermined distances along the directions indicated by the arrow A and which extend along the directions indicated by the arrow C. Each of the lead end holding grooves 56a, 58a, 60a, 62a has a width along the directions indicated by the arrow A and a depth along the directions indicated by the arrow B, the width and the depth being large enough to hold the beginning or terminating end of a coil strand 18a in the form of a flat wire. Similarly, the block 52b has a plurality of lead end holding grooves 56b, 58b, 60b, 62b defined therein which are spaced by predetermined distances along the directions indicated by the arrow A and which extend along the directions indicated by the arrow C. Each of the lead end holding grooves 56b, 58b, 60b, 62b has a width and a depth large enough to hold the beginning or terminating end of a coil strand 18a. As shown in FIGS. 2 through 5, the lead end holding groove 56a and the lead end holding groove 56b are of substantially the same height, the lead end holding groove 58a and the lead end holding groove 58b are of substantially the same height, the lead end holding groove 60a and the lead end holding groove 60b are of substantially the same height, and the lead end holding groove 62a and the lead end holding groove 62b are of substantially the same height.

The lead end holding grooves 56a, 58a, 60a, 62a are defined by ledges 66a, 68a, 70a, 72a, 74a of the block 52a which extend as flat plates from a base 64a of the block 52a along the direction indicated by the arrow B1 and the direction indicated by the arrow C2. Likewise, the lead end holding grooves 56b, 58b, 60b, 62b are defined by ledges 66b, 68b, 70b, 72b, 74b of the block 52b which extend as flat plates from a base 64b of the block 52b along the direction indicated by the arrow B1 and the direction indicated by the arrow C1. The ledges 72a, 72b are interconnected by a joint 76 along the directions indicated by the arrow C.

Each of the divided core members 14A of the stator core 16A has coil strands 18a of the same shape that are wound into a coil 18. The lead holder 52 holds the beginning or terminating ends of the coil strands 18a in the respective lead end holding grooves 56a, 58a, 60a, 62a and the respective lead end holding grooves 56b, 58b, 60b, 62b along the directions indicated by the arrows C, each of the coil strands 18a having longer sides of its flat wire oriented along the directions indicated by the arrow A (see FIG. 5), i.e., along the widthwise directions of the lead end holding grooves 56a, 58a, 60a, 62a and the lead end holding grooves 56b, 58b, 60b, 62b. As shown in FIGS. 4 and 5, therefore, the lead end holding grooves 56a, 58a, 60a, 62a and the lead end holding grooves 56b, 58b, 60b, 62b have substantially the same width, i.e., height. As shown in FIG. 5, the lead end holding grooves 56a, 56b, which are disposed in the highest position among the lead end holding grooves 56a, 58a, 60a, 62a and the lead end holding grooves 56b, 58b, 60b, 62b, are deeper than the other lead end holding grooves 58a, 60a, 62a, 58b, 60b, 62b, which are of substantially the same depth.

The lead end holding groove 56a and the lead end holding groove 56b guide and hold a beginning or terminating end of the same coil strand 18a. The lead end holding groove 58a and the lead end holding groove 58b guide and hold a beginning or terminating end of the same coil strand 18a. The lead end holding groove 60a and the lead end holding groove 60b guide and hold a beginning or terminating end of the same coil strand 18a. The lead end holding groove 62a and the lead end holding groove 62b guide and hold a beginning or terminating end of the same coil strand 18a.

Specifically, the beginning ends of the coil strands 18a of the six coils 18 in the U1- through U6-phases are connected to the input terminal U, the beginning ends of the coil strands 18a of the six coils 18 in the V1- through V6-phases are connected to the input terminal V, and the beginning ends of the coil strands 18a of the six coils 18 in the W1- through W6-phases are connected to the input terminal W. The terminating ends of the coil strands 18a of the coils 18 in all the phases, i.e., the U1- through U6-phases, the V1- through V6-phases, and the W1- through W6-phases, are connected to the neutral terminal N.

Figure 7:
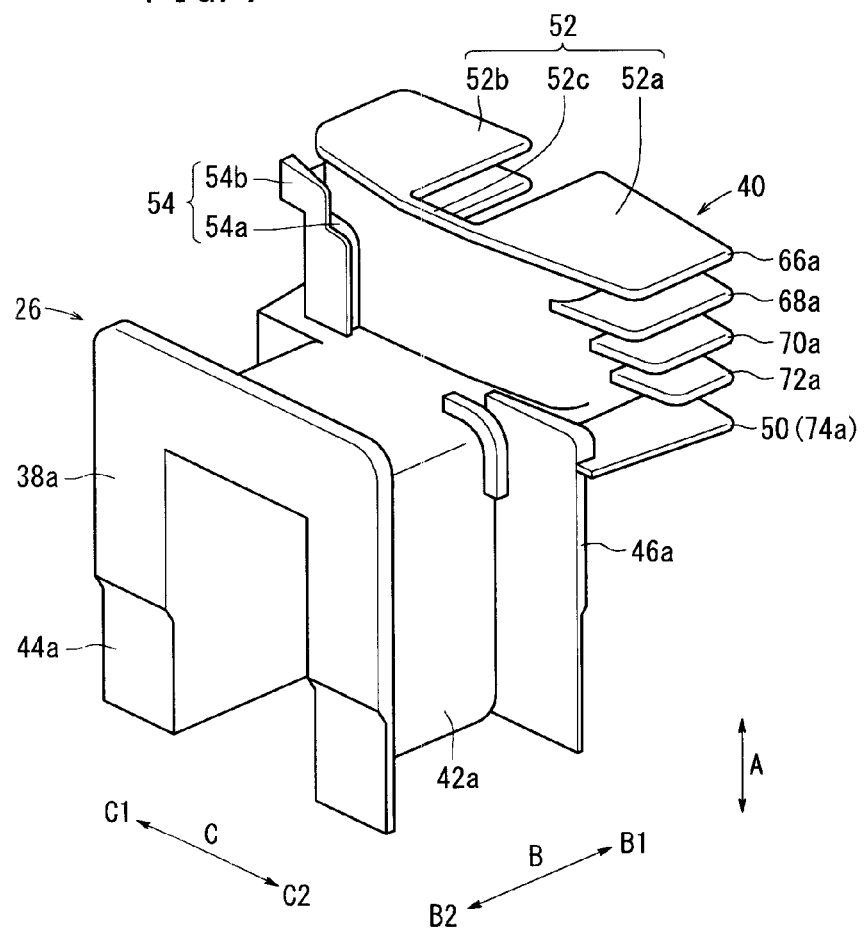
FIG. 7 is a fragmentary perspective view of the insulator shown in FIG. 2.

The terminating ends of the coil strands 18a of the eighteen coils 18 in all the phases are guided and held in the deepest lead end holding grooves 56a, 56b. The terminating end retainer 54 for retaining the terminating end of the coil strand 18a wound on the coil frame 38 of each of the divided core members 14A is disposed behind the block 52b of the lead holder 52. As shown in FIG. 7, the terminating end retainer 54 of each of the divided core members 14A, 14B includes an upstanding member 54a having substantially the same width as the longer sides of the coil strand 18a and extending vertically in the directions indicated by the arrow A along the block 52b, and a wall 54b projecting from an end wall of the upstanding member 54a in the direction indicated by the arrow B2. The terminating end of the coil strand 18a of the coil 18 wound on the coil frame 38 of each of the divided core members 14A is retained on the terminating end retainer 54 with a longer side thereof extending along the surface of the upstanding member 54a and a shorter side thereof extending along the wall 54b and the block 52b, and is then guided into the lead end holding grooves 56a, 56b. In FIG. 5, the terminating ends of the coil strands 18a are guided and held in the lead end holding grooves 56a, 56b.

The beginning ends of the coil strands 18a of the six coils 18 in the U1- through U6-phases are guided and held in the lead end holding grooves 58a, 58b. The beginning ends of the coil strands 18a of the six coils 18 in the V1- through V6-phases are guided and held in the lead end holding grooves 60a, 60b. The beginning ends of the coil strands 18a of the six coils 18 in the W1- through W6-phases are guided and held in the lead end holding grooves 62a, 62b.

The ledges 66a, 68a, 70a, 72a, 74a and the ledges 66b, 68b, 70b, 72b, 74b have recesses and lands extending along the directions indicated by the arrow B and facing the lead end holding grooves 56a, 58a, 60a, 62a and the lead end holding grooves 56b, 58b, 60b, 62b.

Specifically, the ledges 66a, 68a, 70a, 72a of the block 52a have respective arcuate (arc-like) recesses 80a, 82a, 84a, 86a defined in their lower surfaces which face the respective lead end holding grooves 56a, 58a, 60a, 62a and extend along the directions indicated by the arrow B. The recesses 80a, 82a, 84a, 86a are concave in the widthwise directions of the lead end holding grooves 56a, 58a, 60a, 62a. The ledges 68a, 70a, 72a, 74a of the block 52a have respective arcuate (arc-like) lands 88a, 90a, 92a, 94a disposed on their upper surfaces which face the respective recesses 80a, 82a, 84a, 86a and extend along the directions indicated by the arrow B. The lands 88a, 90a, 92a, 94a are convex in the widthwise directions of the lead end holding grooves 56a, 58a, 60a, 62a. The recesses 80a, 82a, 84a, 86a and the lands 88a, 90a, 92a, 94a are disposed in substantially aligned positions with respect to the directions indicated by the arrow C. As described later, the depth of the recesses 80a, 82a, 84a, 86a and the height of the lands 88a, 90a, 92a, 94a are substantially the same each other.

The ledges 66b, 68b, 70b, 72b of the block 52b have respective lands 88b, 90b, 92b, 94b disposed on their lower surfaces, and the ledges 68b, 70b, 72b, 74b have respective recesses 80b, 82b, 84b, 86b defined in their upper surfaces.

Specifically, the ledges 66b, 68b, 70b, 72b have respective arcuate (arc-like) lands 88b, 90b, 92b, 94b disposed on their lower surfaces which face the respective lead end holding grooves 56b, 58b, 60b, 62b and extend along the directions indicated by the arrow B. The lands 88b, 90b, 92b, 94b are convex in the widthwise directions of the lead end holding grooves 56b, 58b, 60b, 62b. The ledges 68b, 70b, 72b, 74b have respective arcuate (arc-like) recesses 80b, 82b, 84b, 86b defined in their upper surfaces which face the respective lands 88b, 90b, 92b, 94b and extend along the directions indicated by the arrow B. The recesses 80b, 82b, 84b, 86b are concave in the widthwise directions of the lead end holding grooves 56b, 58b, 60b, 62b. The recesses 80b, 82b, 84b, 86b and the lands 88b, 90b, 92b, 94b are disposed in substantially aligned positions with respect to the directions indicated by the arrow C, i.e., with respect to the widthwise directions of the ledges 66b, 68b, 70b, 72b, 74b. As described later, the depth of the recesses 80b, 82b, 84b, 86b and the height of the lands 88b, 90b, 92b, 94b are substantially the same each other.

As shown in FIGS. 4 and 5, when the beginning or terminating ends of the coil strands 18a are guided into the lead end holding grooves 56a, 58a, 60a, 62a and the lead end holding grooves 56b, 58b, 60b, 62b while the flat wires of the oil strands 18a have longer sides lying on bottom surfaces 100a, 102a, 104a, 106a, 100b, 102b, 104b, 106b of the lead end holding grooves 56a, 58a, 60a, 62a, 56b, 58b, 60b, 62b, i.e., surfaces of the bases 64a, 64b which face in the direction indicated by the arrow B1, the beginning or terminating ends of the coil strands 18a are held in the lead end holding grooves 56a, 58a, 60a, 62a, 56b, 58b, 60b, 62b, as follows:

As described above, the recesses 80a, 82a, 84a, 86a are defined in the lower surfaces of the ledges 66a, 68a, 70a, 72a of the block 52a of each of the divided core members 14A, and the lands 88a, 90a, 92a, 94a are disposed on the upper surfaces of the ledges 68a, 70a, 72a, 74a of the block 52a in facing relation to the recesses 80a, 82a, 84a, 86a across the lead end holding grooves 56a, 58a, 60a, 62a. The lands 88b, 90b, 92b, 94b are disposed on the lower surfaces of the ledges 66b, 68b, 70b, 72b of the block 52b, and the recesses 80b, 82b, 84b, 86b are defined in the upper surfaces of the ledges 68b, 70b, 72b, 74b of the block 52b in facing relation to the lands 88b, 90b, 92b, 94b across the lead end holding grooves 56b, 58b, 60b, 62b.

Figure 6:
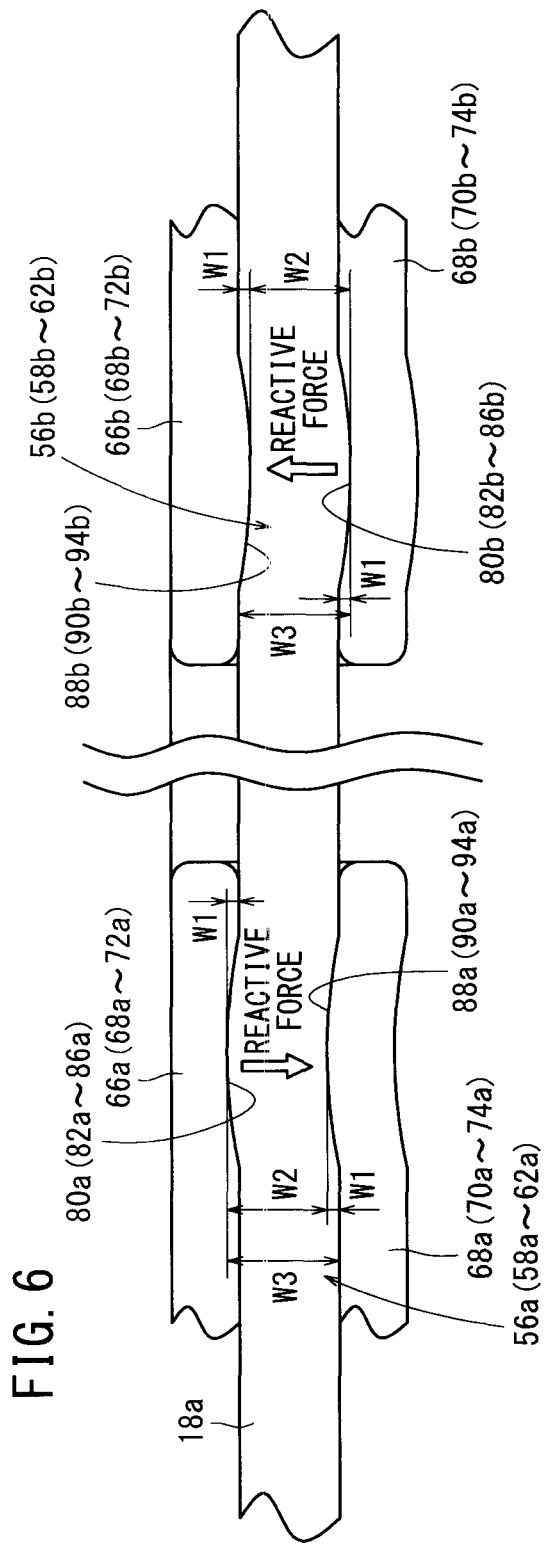
FIG. 6 is a fragmentary front elevational view schematically showing the manner in which a coil strand end is placed in lead end holding grooves.

In other words, as shown in FIGS. 4 and 6, the lead end holding groove 56a and the lead end holding groove 56b, the lead end holding groove 58a and the lead end holding groove 58b, the lead end holding groove 60a and the lead end holding groove 60b, and the lead end holding groove 62a and the lead end holding groove 62b are of an undulating shape because of the recesses 80a, 82a, 84a, 86a, 80b, 82b, 84b, 86b and the lands 88a, 90a, 92a, 94a, 88b, 90b, 92b, 94b that are alternately disposed along the directions indicated by the arrow C.

Therefore, when the beginning or terminating ends of the coil strands 18a are placed in the lead end holding grooves 56a, 58a, 60a, 62a, 56b, 58b, 60b, 62b, the beginning or terminating ends of the coil strands 18a are deformed or bent along the recesses 80a, 82a, 84a, 86a, 80b, 82b, 84b, 86b and the lands 88a, 90a, 92a, 94a, 88b, 90b, 92b, 94b. As a result, after the beginning or terminating ends of the coil strands 18a are placed in the lead end holding grooves 56a, 58a, 60a, 62a, 56b, 58b, 60b, 62b, the deformed or bent portions of the beginning or terminating ends of the coil strands 18a undergo reactive forces tending to cause themselves to spring back toward the lands 88a, 90a, 92a, 94a, 88b, 90b, 92b, 94b. Under the reactive forces, the deformed or bent portions are pressed against the lands 88a, 90a, 92a, 94a, 88b, 90b, 92b, 94b. Consequently, the beginning or terminating ends of the coil strands 18a are held in an undulating shape within the lead end holding grooves 56a, 58a, 60a, 62a, 56b, 58b, 60b, 62b while being securely retained on the lands 88a, 90a, 92a, 94a, 88b, 90b, 92b, 94b.

As shown in FIG. 6, it is assumed that the height of the lands 88a, 90a, 92a, 94a, 88b, 90b, 92b, 94b from the ledges 68a, 70a, 72a, 74a, 66b, 68b, 70b, 72b, and the depth of the recesses 80a, 82a, 84a, 86a, 80b, 82b, 84b, 86b from the ledges 66a, 68a, 70a, 72a, 68b, 70b, 72b, 74b are represented by w1, the width of the beginning or terminating ends of each coil strand 18a, i.e., the width of a flat wire across its longer sides, is represented by w2, and the width of the lead end holding grooves 56a, 58a, 60a, 62a, 56b, 58b, 60b, 62b, i.e., the distance from the deepest point of the recesses 80a, 82a, 84a, 86a, 80b, 82b, 84b, 86b to the ledges 68a, 70a, 72a, 74a, 66b, 68b, 70b, 72b or the bases of the lands 88a, 90a, 92a, 94a, 88b, 90b, 92b, 94b, is represented by w3. The distances w1, w2, w3 may satisfy the following relationship (1):

$$w1 < (w3 - w2) < (2 \times w1) \quad (1)$$

If the distance w1 is established in accordance with the above relationship (1), then the beginning or terminating ends of the coil strands 18a can be placed in the lead end holding grooves 56a, 58a, 60a, 62a, 56b, 58b, 60b, 62b without rubbing against the ledges 66a, 68a, 70a, 72a, 74a, 66b, 68b, 70b, 72b, 74b, and can easily be deformed into an undulating shape.

Figure 8A:
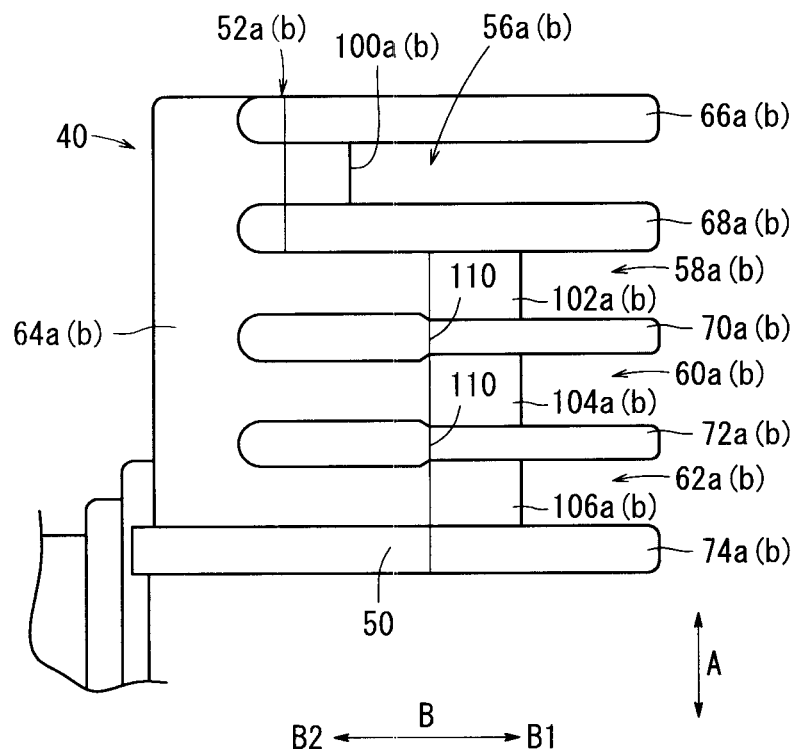
FIG. 8A is a fragmentary side elevational view of the insulator shown in FIG. 2.
Figure 8B:
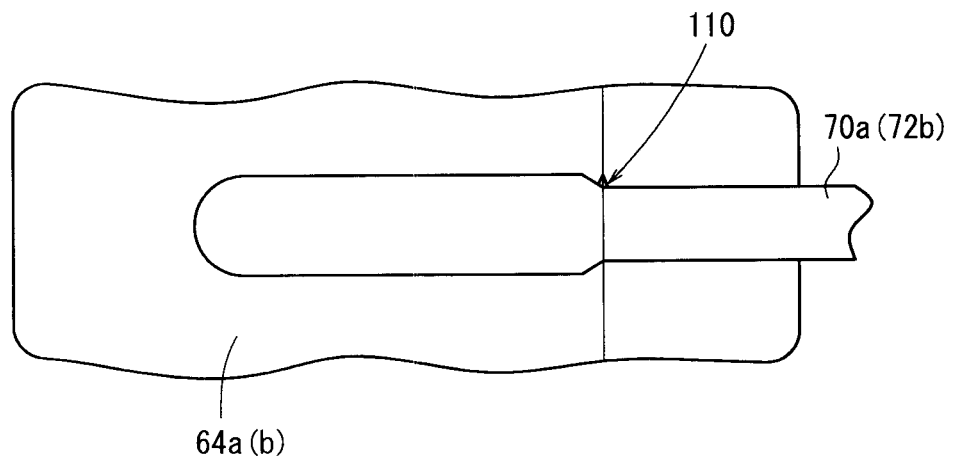
FIG. 8B is an enlarged fragmentary side elevational view of the insulator.

As shown in FIGS. 8A and 8B, if the side surface of each of the ledges 70a, 72a across the directions indicated by the arrow C has a PL (parting line) region 110 positionally aligned with a parting line of a die assembly by which the insulator 26 is molded, then burrs may possibly be formed in each PL region 110. Therefore, each of the ledges 70a, 72a may include a thinner or recessing portion extending from the PL region 110 along the direction indicated by the arrow B1 to prevent burrs in each PL region 110 from contacting coil strands 18a. In FIGS. 8A and 8B, the PL regions 110 are positioned on the side surfaces of the ledges 70a, 72a. However, PL regions 110 may be provided in positional alignment with other parting lines, if any, of a die assembly by which the insulator 26 is molded.

The stator 10A for use in rotary electric machines according to the first embodiment of the present invention is constructed as described above. A process of guiding and placing coil strands 18a on each divided core member 14A will be described below with reference to FIGS. 9 and 10A through 10C, as well as FIGS. 1 through 8B.

Figure 9:
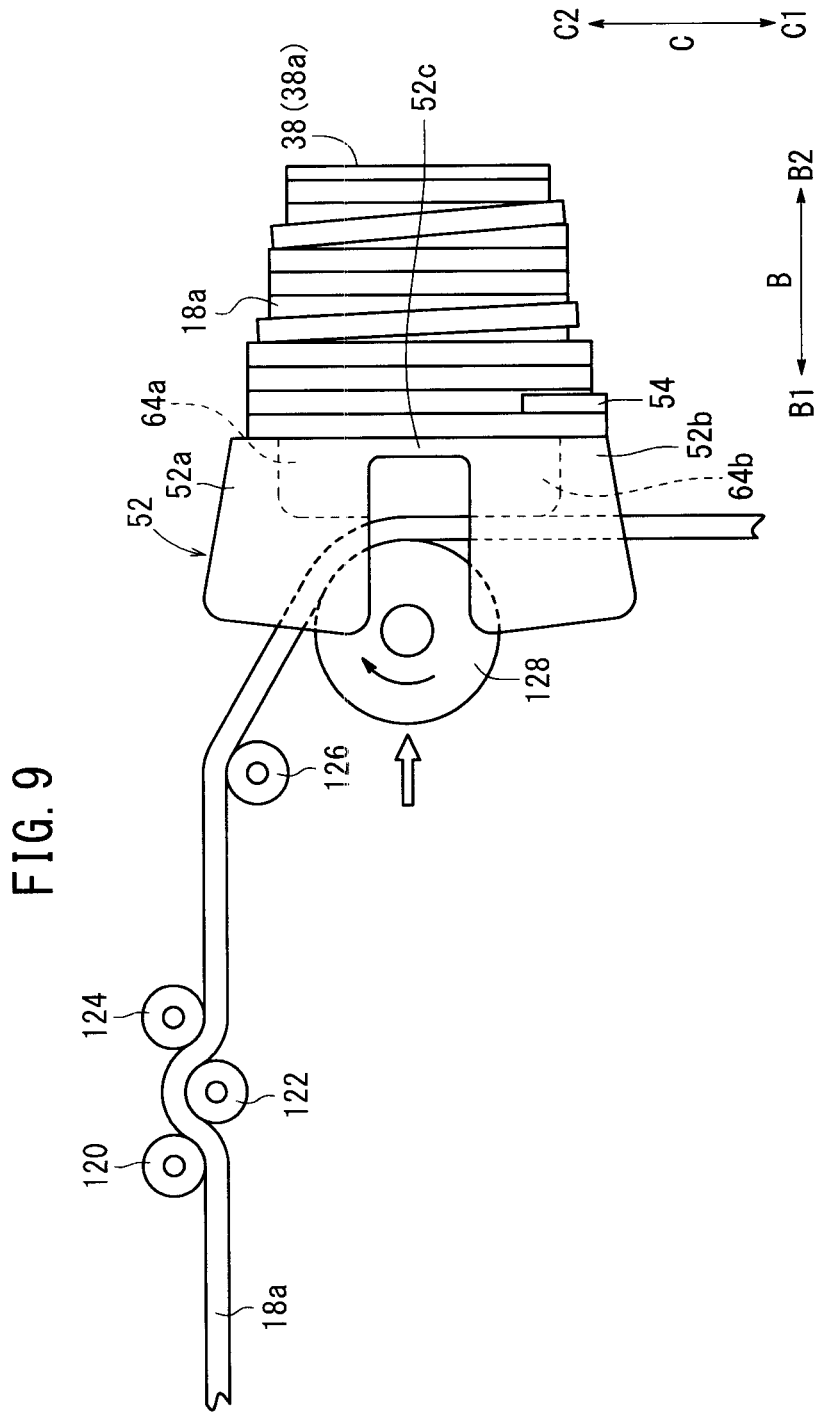
FIG. 9 is a view schematically showing the manner in which the terminating end of a coil strand is guided into lead end holding grooves.

FIG. 9 is a view showing the manner in which the terminating end of a coil strand 18a is guided into the lead end holding grooves 56a, 56b of a divided core member 14A.

For actually manufacturing the stator core 16A for use in a rotary electric machine, coil strands 18a are wound on the coil frames 38 of the divided core members 14A to produce the coils 18. Then, the teeth 34 and the recesses 32 of every adjacent two of the divided core members 14A are fitted together, interconnecting the divided core members 14A in an annular pattern to produce the stator core 16A. Thereafter, the beginning and terminating ends of the coil strands 18a are guided into the lead end holding grooves 56a, 56b of the divided core members 14A. For illustrative purposes, the process of guiding and housing the terminating end of a coil strand 18a into the lead end holding grooves 56a, 56b of one divided core member 14A will be described below.

As shown in FIG. 9, the coil strand 18a to be guided is tensioned by three successive tension rollers 120, 122, 124 and then led by a guide roller 126 to the divided core member 14A. The coil strand 18a is then pressed into the lead end holding grooves 56a, 56b by a cylindrical presser jig 128 as it rotates about its own axis and pushes the coil strand 18a along the direction indicated by the arrow B2.

The ledges 66a, 68b which partly define the lead end holding grooves 56a, 56b have the respective recesses 80a, 80b, and the ledges 68a, 66b which partly define the lead end holding grooves 56a, 56b have the respective lands 88a, 88b that are aligned respectively with the recesses 80a, 80b. Therefore, the lead end holding grooves 56a, 56b are of an undulating shape. The terminating end of the coil strand 18a that is pressed into the lead end holding grooves 56a, 56b by the presser jig 128 is thus deformed into an undulating shape by the recesses 80a, 80b and the lands 88a, 88b, and the deformed portions of the coil strand 18a are securely retained on the lands 88a, 88b as the deformed portions tend to spring back.

Figure 10A:
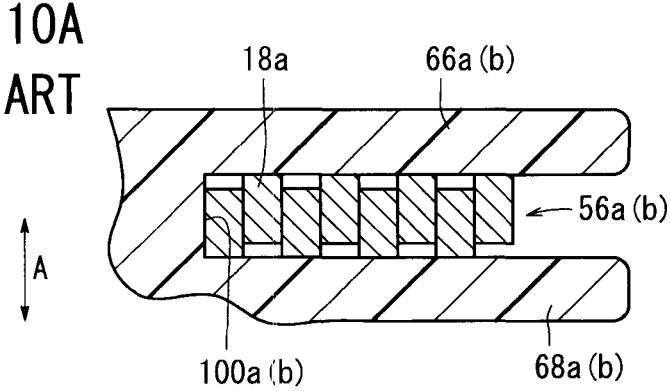
FIG. 10A is a fragmentary cross-sectional view showing the manner in which terminating ends of coil strands are placed in lead end holding grooves according to a guiding method of the related art.
Figure 10B:
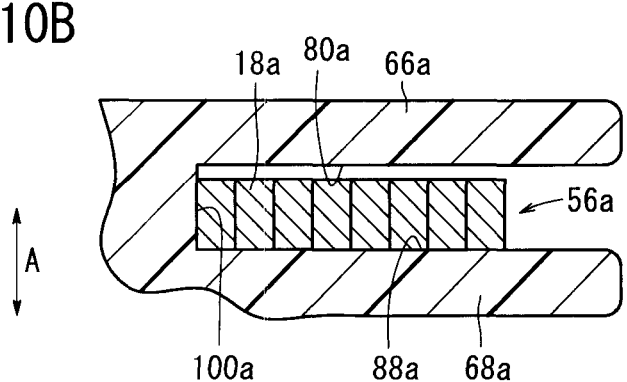
FIGS. 10B and 10C are fragmentary cross-sectional views each showing the manner in which terminating ends of coil strands are placed in lead end holding grooves according to the first embodiment.
Figure 10C:
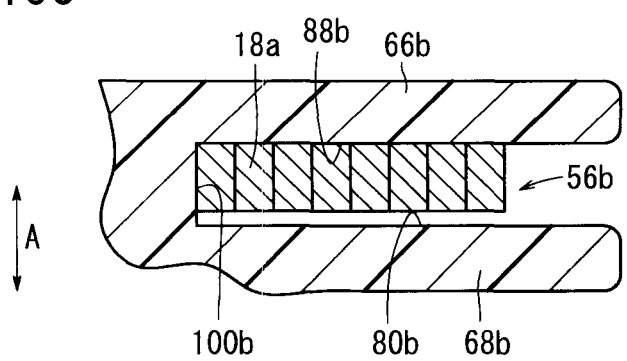
Figure 11:
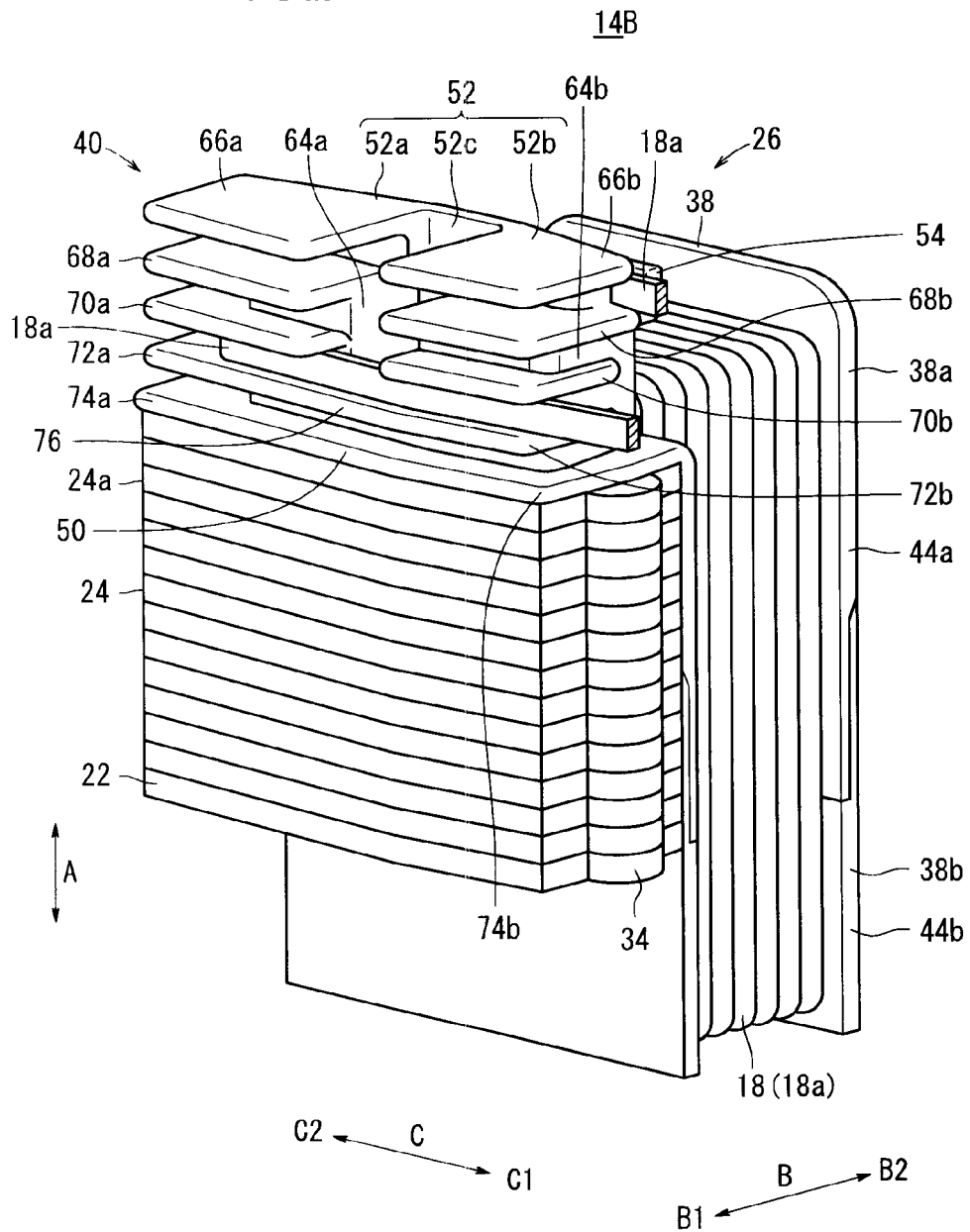
FIG. 11 is a perspective view of a divided core member according to the second embodiment.
Figure 12:
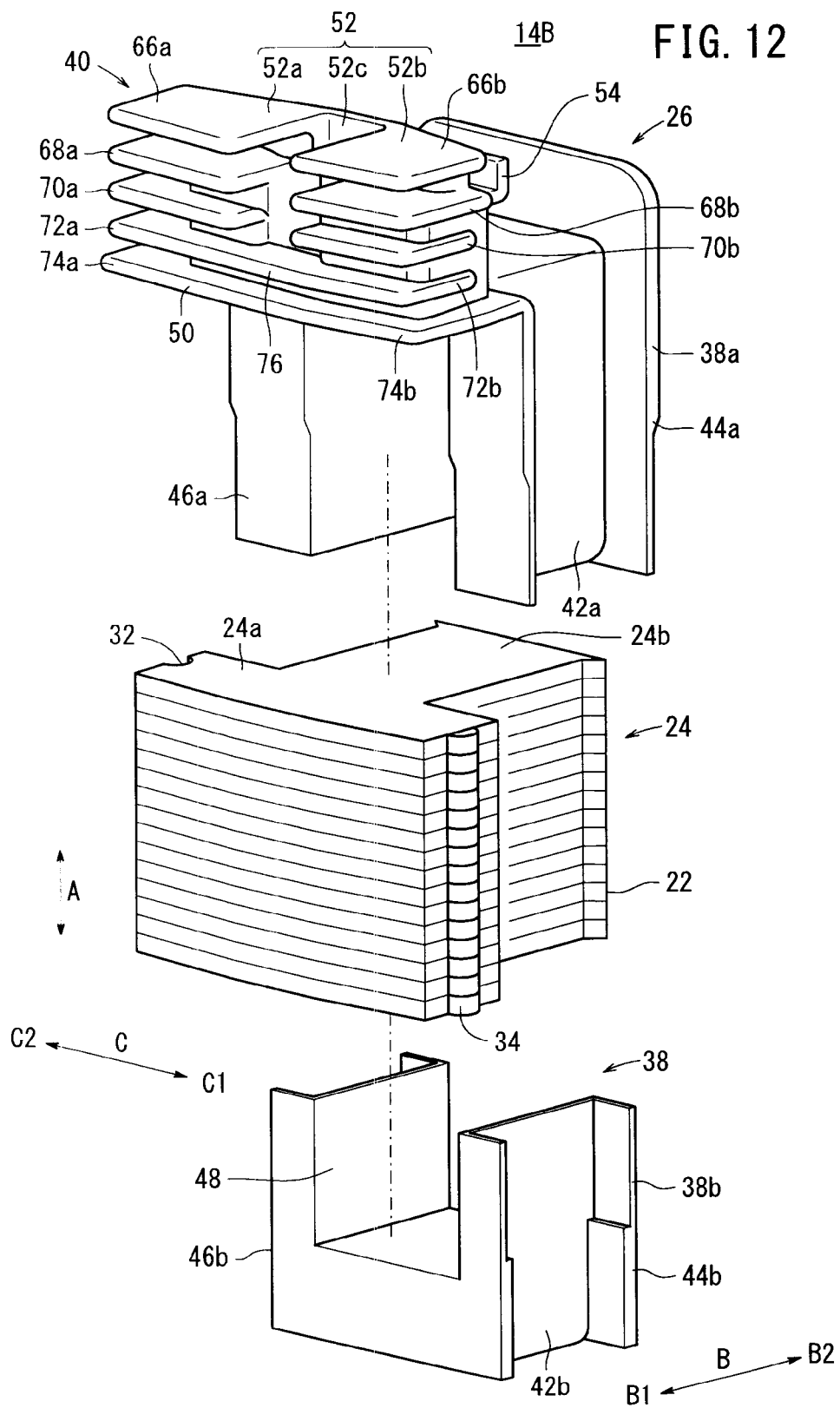
FIG. 12 is an exploded perspective view of the divided core member shown in FIG. 11.

FIG. 10A shows the manner in which the terminating ends of coil strands 18a are placed in the lead end holding grooves 56a, 56b according to a guiding method of the related art wherein the ledges 66a, 66b, 68a, 68b that define the lead end holding grooves 56a, 56b are free of recesses and lands. FIGS. 10B and 10C show the manner in which the terminating ends of coil strands 18a are placed in the lead end holding grooves 56a, 56b according to the first embodiment wherein the ledges 66a, 66b, 68a, 68b, that define the lead end holding grooves 56a, 56b have the recesses 80a, 80b and the lands 88a, 88b.

According to the related art, as shown in FIG. 10A, since the ledges 66a, 66b, 68a, 68b that define the lead end holding grooves 56a, 56b are free of recesses and lands, when the coil strands 18a are placed in the lead end holding grooves 56a, 56b, there are vertical gaps between the coil strands 18a in the lead end holding grooves 56a, 56b and the ledges 66a, 66b, 68a, 68b. If the divided core members 14A with such vertical gaps between the coil strands 18a in the lead end holding grooves 56a, 56b and the ledges 66a, 66b, 68a, 68b are assembled into a stator 10A, then when a rotary electric machine with such a stator is in operation, the terminating ends of the coil strands 18a tend to rub against the ledges 66a, 66b, 68a, 68b, breaking their insulation coverings.

According to the first embodiment, as shown in FIGS. 10B and 10C, the terminating ends of the coil strands 18a are housed in the lead end holding grooves 56a, 56b while being retained in position by the lands 88a, 88b because the terminating ends of the coil strands 18a tend to spring back. Even when a rotary electric machine incorporating the stator 10A which includes the divided core members 14A vibrates while in operation, since the terminating ends of the coil strands 18a are securely retained on the lands 88a, 88b, the terminating ends of the coil strands 18a are prevented from rubbing against the ledges 66a, 66b, 68a, 68b and hence, e.g., from breaking their insulation coverings.

In FIGS. 9 through 10C, the terminating ends of the coil strands 18a are shown as being guided and placed in the lead end holding grooves 56a, 56b. The beginning ends of the coil strands 18a may also be guided and placed in the other lead end holding grooves 58a, 60a, 62a, 58b, 60b, 62b for being securely positioned to safeguard themselves against frictional engagement with the ledges 66a, 66b, 68a, 68b for obtaining the advantages same as the above case.

With the stator 10A for use in a rotary electric machine according to the first embodiment, as described above, when the beginning or terminating ends of the coil strands 18a are placed in the lead end holding grooves 56a, 58a, 60a, 62a, 56b, 58b, 60b, 62b, they are deformed or bent by the lands 88a, 90a, 92a, 94a, 88b, 90b, 92b, 94b. Therefore, the deformed portions of the beginning or terminating ends of the coil strands 18a which have been guided in the lead end holding grooves 56a, 58a, 60a, 62a, 56b, 58b, 60b, 62b undergo reactive forces tending to cause themselves to spring back toward the lands 88a, 90a, 92a, 94a, 88b, 90b, 92b, 94b. Under the reactive forces, the deformed or bent portions are securely retained on the lands 88a, 90a, 92a, 94a, 88b, 90b, 92b, 94b.

When a rotary electric machine incorporating the stator 10A which includes the ends of the coil strands 18a that are placed in the lead end holding grooves 56a, 58a, 60a, 62a, 56b, 58b, 60b, 62b is in operation, since the ends of the coil strands 18a are securely retained on the lands 88a, 90a, 92a, 94a, 88b, 90b, 92b, 94b under reactive forces acting on the deformed portions, the ends of the coil strands 18a are prevented from rubbing against the ledges 66a, 68a, 70a, 72a, 74a, 66b, 68b, 70b, 72b, 74b despite vibrations of the rotary electric machine and hence, e.g., from breaking their insulation coverings.

As the deformed portions of the ends of the coil strands 18a are retained on the lands 88a, 90a, 92a, 94a, 88b, 90b, 92b, 94b, the areas of contact between the ends of the coil strands 18a and the ledges 66a, 68a, 70a, 72a, 74a, 66b, 68b, 70b, 72b, 74b are increased, and hence the surface pressure therebetween is reduced. Consequently, the ends of the coil strands 18a are prevented from being scraped off when the rotary electric machine vibrates during operation.

According to the first embodiment, therefore, when the rotary electric machine vibrates during operation, the ends of the coil strands 18a are securely held in the lead end holding grooves 56a, 58a, 60a, 62a, 56b, 58b, 60b, 62b.

The lands 88a, 90a, 92a, 94a, 88b, 90b, 92b, 94b are alternately disposed on the ledges 66a, 68a, 70a, 72a, 74a, 66b, 68b, 70b, 72b, 74b along the circumferential directions of the stator core 16A, i.e., along the directions indicated by the arrow C. Consequently, the ends of the coil strands 18a are housed in the lead end holding grooves 56a, 58a, 60a, 62a, 56b, 58b, 60b, 62b in an undulating shape along the circumferential directions of the stator core 16A. As a result, the ends of the coil strands 18a and the ledges 66a, 68a, 70a, 72a, 74a, 66b, 68b, 70b, 72b, 74b are reliably prevented from rubbing against each other despite vibrations that are caused when the rotary electric machine is in operation.

Each insulator 26 has the two blocks 52a, 52b spaced from each other along the directions indicated by the arrow C, and the blocks 52a, 52b have the lead end holding grooves 56a, 58a, 60a, 62a and the lead end holding grooves 56b, 58b, 60b, 62b, respectively. Therefore, when the ends of the coil strands 18a are placed in the lead end holding grooves 56a, 58a, 60a, 62a, 56b, 58b, 60b, 62b, an increased number of portions of the ends of the coil strands 18a are deformed or bent along the lands 88a, 90a, 92a, 94a, 88b, 90b, 92b, 94b. Accordingly, the ends of the coil strands 18a are securely held in the lead end holding grooves 56a, 58a, 60a, 62a, 56b, 58b, 60b, 62b.

One set of the ledges 68a, 70a, 72a, 74a and the ledges 66b, 68b, 70b, 72b has the lands 88a, 90a, 92a, 94a, 88b, 90b, 92b, 94b, and the other set of the ledges 66a, 68a, 70a, 72a and the ledges 68b, 70b, 72b, 74b has the recesses 80a, 82a, 84a, 86a, 80b, 82b, 84b, 86b in alignment with the respective lands 88a, 90a, 92a, 94a, 88b, 90b, 92b, 94b. Consequently, the ends of the coil strands 18a can easily be deformed into an undulating shape along the lands 88a, 90a, 92a, 94a, 88b, 90b, 92b, 94b and the recesses 80a, 82a, 84a, 86a, 80b, 82b, 84b, 86b. As the deformed portions of the ends of the coil strands 18a are retained on the lands 88a, 90a, 92a, 94a, 88b, 90b, 92b, 94b and the recesses 80a, 82a, 84a, 86a, 80b, 82b, 84b, 86b, the areas of contact between the ends of the coil strands 18a and the ledges 66a, 68a, 70a, 72a, 74a, 66b, 68b, 70b, 72b, 74b are increased, and hence the surface pressure therebetween is reduced. Consequently, the ends of the coil strands 18a are prevented from being scraped off when the rotary electric machine vibrates during operation.

The lands 88a, 90a, 92a, 94a, 88b, 90b, 92b, 94b and the recesses 80a, 82a, 84a, 86a, 80b, 82b, 84b, 86b extend along the depthwise direction of the lead end holding grooves 56a, 58a, 60a, 62a, 56b, 58b, 60b, 62b, i.e., along the directions indicated by the arrow B. Therefore, when the ends of the coil strands 18a that are wound on the coil frames 38 of the divided core members 14A are guided into the lead end holding grooves 56a, 58a, 60a, 62a, 56b, 58b, 60b, 62b, the ends of all the coil strands 18a are deformed into an undulating shape along the lands 88a, 90a, 92a, 94a, 88b, 90b, 92b, 94b and the recesses 80a, 82a, 84a, 86a, 80b, 82b, 84b, 86b.

With the distance w1 being set to satisfy the inequality (1) described above, when the ends of the coil strands 18a are guided into the lead end holding grooves 56a, 58a, 60a, 62a, 56b, 58b, 60b, 62b, the ends of the coil strands 18a can be placed in position without rubbing engagement with the ledges 66a, 68a, 70a, 72a, 74a, 66b, 68b, 70b, 72b, 74b, and can easily be deformed into an undulating shape by contact with the lands 88a, 90a, 92a, 94a, 88b, 90b, 92b, 94b.

Each of the coil strands 18a is in the form of a flat wire having a rectangular cross-sectional shape. As the ends of the coil strands 18a are guided into the lead end holding grooves 56a, 58a, 60a, 62a, 56b, 58b, 60b, 62b with the longer sides of the rectangular cross-sectional shape lying along the directions indicated by the arrow A (widthwise directions), the ends of the coil strands 18a undergo greater reactive forces from the lands 88a, 90a, 92a, 94a, 88b, 90b, 92b, 94b, tending to spring back toward the lands 88a, 90a, 92a, 94a, 88b, 90b, 92b, 94b, than if the shorter sides of the rectangular cross-sectional shape lie along the directions indicated by the arrow A.

Since the terminating end of each coil strand 18a is retained on the terminating end retainer 54, the wound coil 18 is prevented from being loosened. Moreover, the PL regions 110, which are aligned with parting lines and formed as thinner or recessed portions, extend correspondingly to the parting lines, are effective to prevent burrs in the PL regions 110 from contacting coil strands 18a.

The second embodiment of the present invention will be described below. Those parts of the second embodiment which are identical to those of the first embodiment are denoted by identical reference numerals, and will not be described in detail below. The second embodiment will be described also with reference to the drawings, e.g., FIGS. 7 through 8B, referred to above with respect to the first embodiment.

FIGS. 11 through 15 show one of the divided core members 14B supporting thereon the respective coils 18 in the U1- through U6-phases, V1- through V6-phases, W1- through W6-phases, according to the second embodiment. The divided core member 14B to be described below is structurally identical to the other divided core members 14B in all phases.

The divided core member 14B according to the second embodiment is different from the divided core member 14A according to the first embodiment in that it is free of the recesses 80a, 82a, 84a, 86a, 80b, 82b, 84b, 86b and the lands 88a, 90a, 92a, 94a, 88b, 90b, 92b, 94b (see FIGS. 2 through 4).

Figure 13:
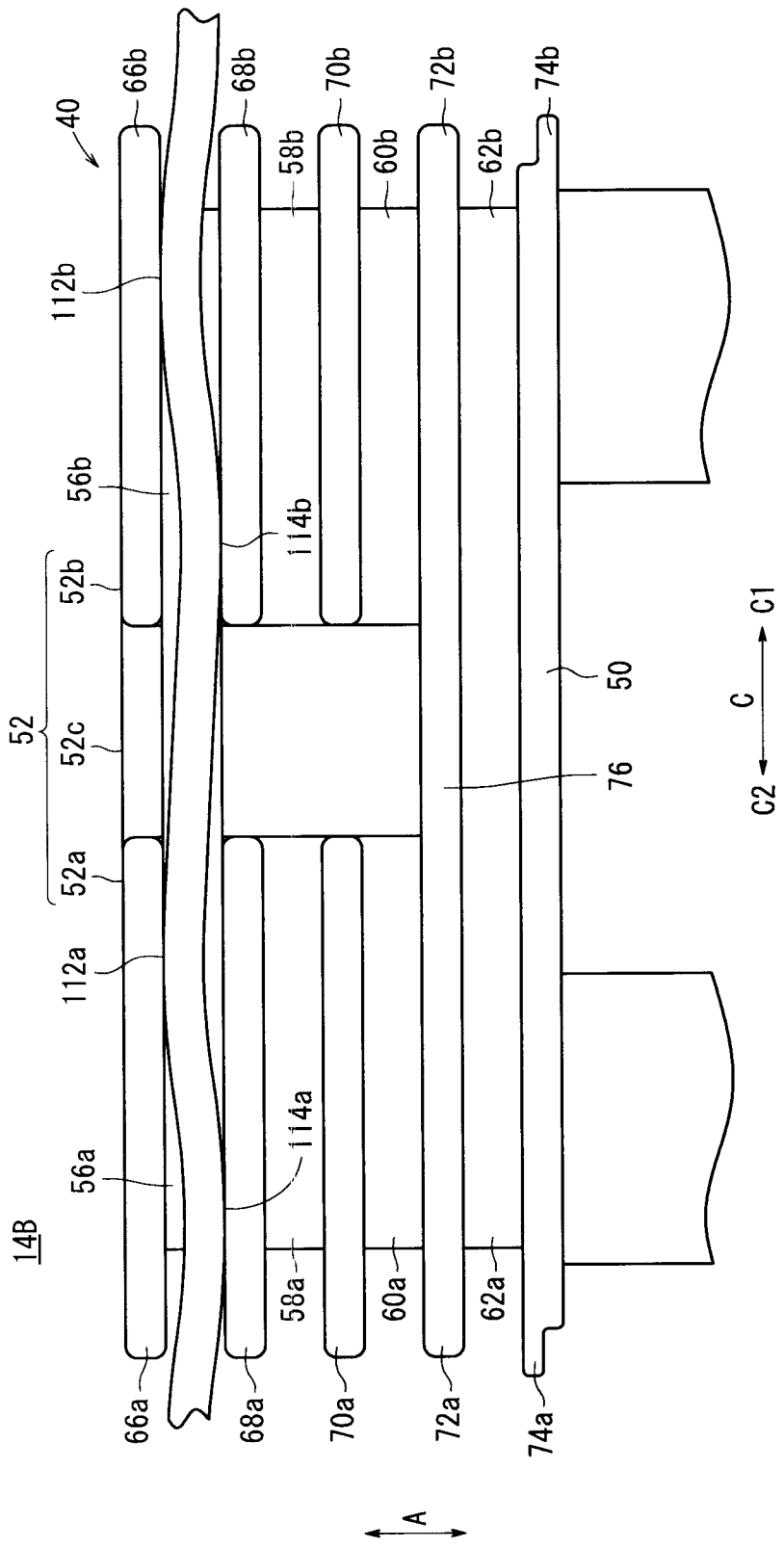
FIG. 13 is a fragmentary front elevational view of an insulator shown in FIG. 11.
Figure 14A:
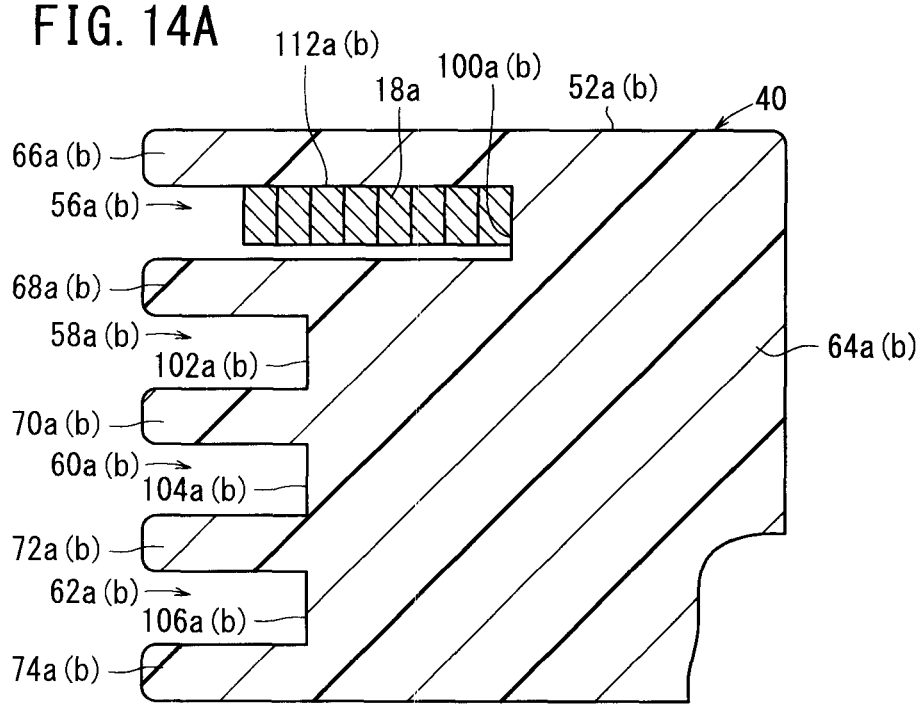
FIGS. 14A and 14B are fragmentary cross-sectional views of the insulator shown in FIG. 11.
Figure 14B:
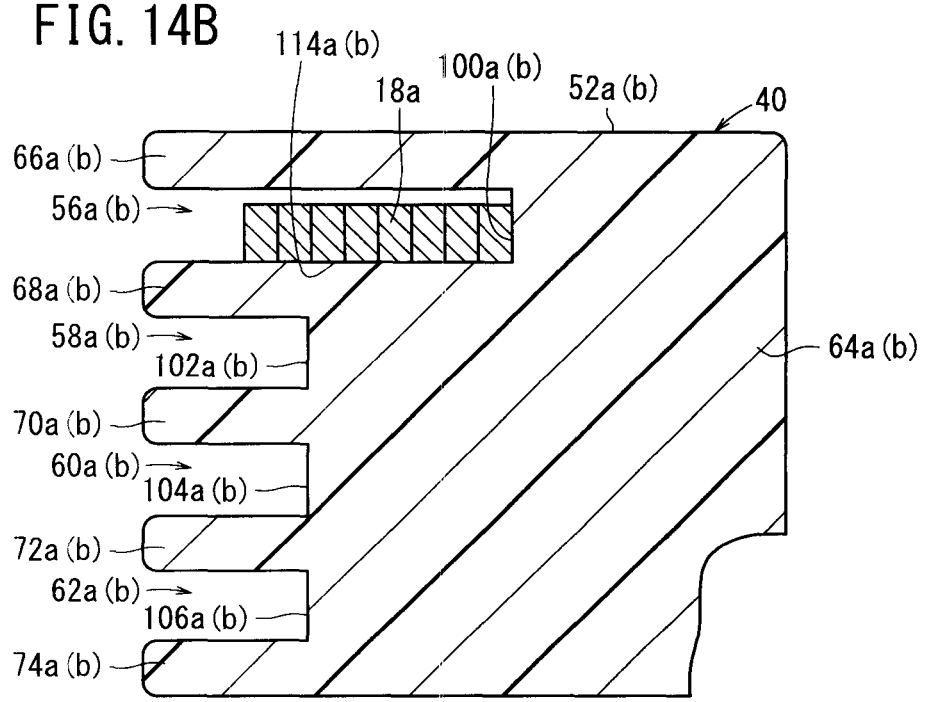
Figure 15:
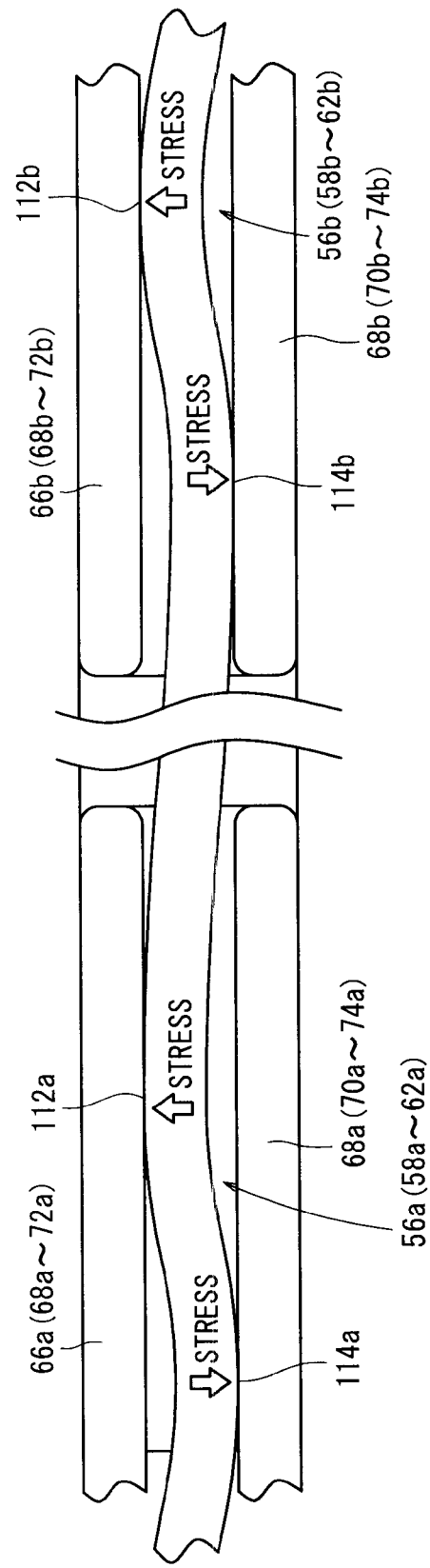
FIG. 15 is a fragmentary front elevational view schematically showing the manner in which a coil strand end is placed in lead end holding grooves.

As shown in FIGS. 13 through 14B, when the beginning or terminating ends of the coil strands 18a are guided into the lead end holding grooves 56a, 58a, 60a, 62a and the lead end holding grooves 56b, 58b, 60b, 62b while the flat wires of the oil strands 18a have longer sides of cross section lying on bottom surfaces 100a, 102a, 104a, 106a, 100b, 102b, 104b, 106b of the lead end holding grooves 56a, 58a, 60a, 62a, 56b, 58b, 60b, 62b, i.e., surfaces of the bases 64a, 64b which face in the direction indicated by the arrow B1, the beginning or terminating ends of the coil strands 18a are held in the lead end holding grooves 56a, 58a, 60a, 62a, 56b, 58b, 60b, 62b, as follows:

The beginning or terminating ends of the coil strands 18a have their longer sides preformed to an undulating shape so as to allow themselves to be guided into the lead end holding grooves 56a, 58a, 60a, 62a, 56b, 58b, 60b, 62b. Specifically, the beginning or terminating ends of the coil strands 18a have an alternate array of a peak 112a, a valley 114a, a peak 112b, a valley 114b, . . . along the coil strands 18a. The undulating beginning or terminating ends of the coil strands 18a are placed in the lead end holding grooves 56a, 58a, 60a, 62a, 56b, 58b, 60b, 62b.

In the block 52a, the peaks 112a, which are upwardly convex, of the beginning or terminating ends of the coil strands 18a are held in close contact with the ledges 66a, 68a, 70a, 72a and apply stresses to the ledges 66a, 68a, 70a, 72a, and the valleys 114a, which are downwardly concave, thereof are held in close contact with the ledges 68a, 70a, 72a, 74a and apply stresses to the ledges 68a, 70a, 72a, 74a.

In the block 52b, similarly, the peaks 112b, which are upwardly convex, of the beginning or terminating ends of the coil strands 18a are held in close contact with the ledges 66b, 68b, 70b, 72b and apply stresses to the ledges 66b, 68b, 70b, 72b, and the valleys 114b, which are downwardly concave, thereof are held in close contact with the ledges 68b, 70b, 72b, 74b and apply stresses to the ledges 68b, 70b, 72b, 74b.

The peaks 112a, 112b are pressed against the ledges 66a, 68a, 70a, 72a and the ledges 66b, 68b, 70b, 72b (see FIGS. 13, 14A, and 15) under upward stresses, and the valleys 114a, 114b are pressed against the ledges 68a, 70a, 72a, 74a and the ledges 68b, 70b, 72b, 74b (see FIGS. 13, 14B, and 15) under downward stresses. Therefore, the beginning or terminating ends of the coil strands 18a are placed in an undulating shape within the lead end holding grooves 56a, 58a, 60a, 62a, 56b, 58b, 60b, 62b while being securely retained on the ledges 66a, 68a, 70a, 72a, 74a, 66b, 68b, 70b, 72b, 74b.

The stator 10B for use in rotary electric machines according to the second embodiment of the present invention is constructed as described above. A process of guiding and placing coil strands 18a on each divided core member 14B, i.e., a method of manufacturing a rotary electric machine, will be described below with reference to FIGS. 16 through 18C, as well as FIGS. 1, 7 through 8B, and 11 through 15.

Figure 16:
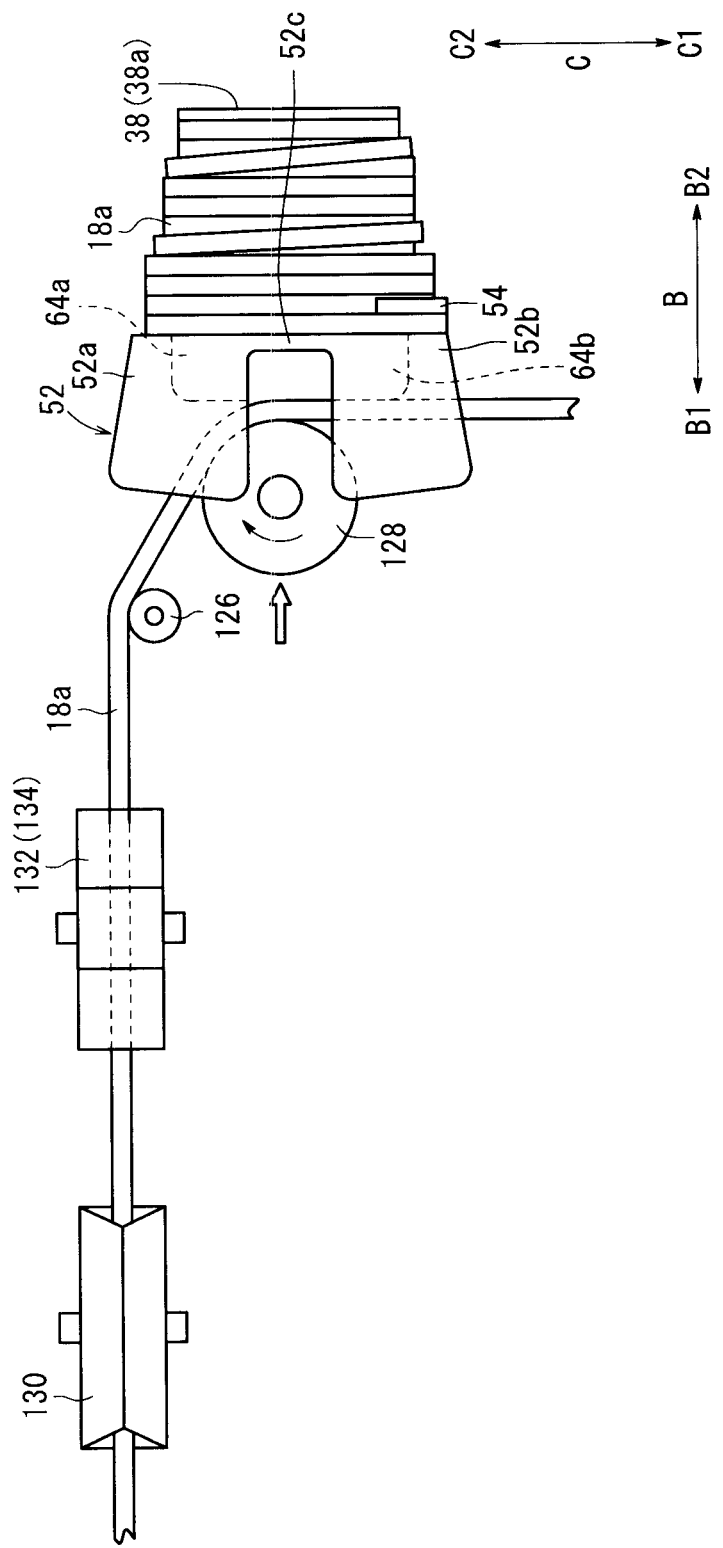
FIG. 16 is a view schematically showing the manner in which the terminating end of a coil strand is guided into a lead end holding groove.
Figure 17:
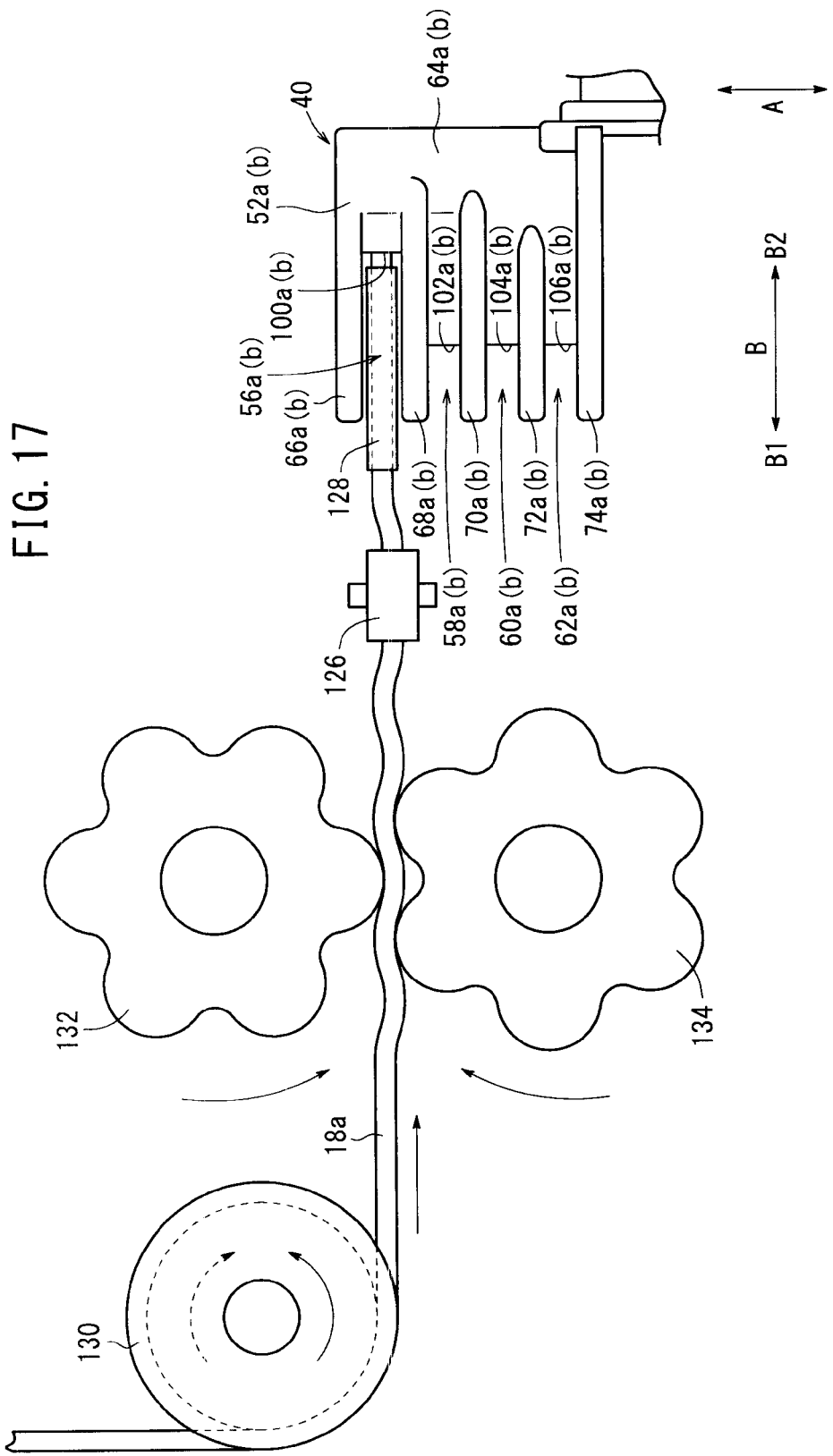
FIG. 17 is a view schematically showing the manner in which the terminating end of a coil strand is introduced into a lead end holding groove.

FIGS. 16 and 17 are views showing the manner in which the terminating end of a coil strand 18a is guided into the lead end holding grooves 56a, 56b of a divided core member 14B.

For actually manufacturing the stator core 16B for use in a rotary electric machine, the upper coil frame member 38a and the lower coil frame member 38b are integrally fitted together to form the coil frame 38 with the magnetic pole 24b of the divided iron core 24 being fitted in the hole 48 (the step of fitting the insulator 26 over the divided iron core 24), and coil strands 18a are wound on the coil frames 38 of the divided core members 14B to produce the coils 18 (the step of constructing the divided core member 14B). Then, the teeth 34 and the recesses 32 of every adjacent two of the divided core members 14B are fitted together, interconnecting the divided core members 14B in an annular pattern to produce the stator core 16B (the step of producing the stator core 16B). Thereafter, the beginning and terminating ends of the coil strands 18a are guided into the lead end holding grooves 56a, 56b of the divided core members 14B. For illustrative purposes, the process of guiding and housing the terminating end of a coil strand 18a into the lead end holding grooves 56a, 56b of one divided core member 14B will be described below.

For guiding the terminating end of the coil strand 18a into the lead end holding grooves 56a, 56b of the divided core member 14B, the coil strand 18a is tensioned to the longer sides of its flat wire by a tension roller 130, and then the longer sides of the coil strand 18a are processed into an undulating shape by two rollers 132, 134 having undulating outer circumferential edges as the rollers 132, 134 rotate about their own axes (the step of processing the terminating end of the coil strand 18a into an undulating shape). At this time, the peaks of one of the rollers 132 and the valleys of the other roller 134, or the valleys of one of the rollers 132 and the peaks of the other roller 134 are successively brought into interdigitating engagement with each other to process the coil strand 18a into an undulating shape. The coil strand 18a with its longer sides processed into an undulating shape is then led by the guide roller 126 to the divided core member 14B. The coil strand 18a is then pressed into the lead end holding grooves 56a, 56b by the cylindrical presser jig 128 as it rotates about its own axis and pushes the coil strand 18a along the direction indicated by the arrow B2.

Since the coil strand 18a is processed into an undulating shape across its longer sides, the peaks 112a, 112b of the terminating end of the coil strand 18a that is pressed by the presser jig 128 are pressed against the ledges 66a, 66b, and the valleys 114a, 114b thereof are pressed against the ledges 68a, 68b. Therefore, the terminating end of the coil strand 18a is securely held in an undulating shape within the lead end holding grooves 56a, 56b (the step of housing the end of a coil lead).

Figure 18A:
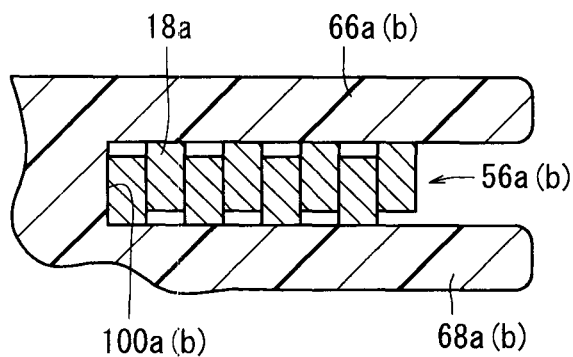
FIG. 18A is a fragmentary cross-sectional view showing the manner in which terminating ends of coil strands are placed in lead end holding grooves according to a guiding method of the related art.
Figure 18B:
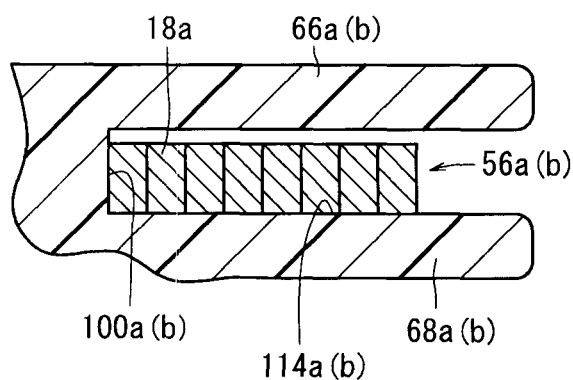
FIGS. 18B and 18C are fragmentary cross-sectional views each showing the manner in which terminating ends of coil strands are placed in lead end holding grooves according to the second embodiment.
Figure 18C:
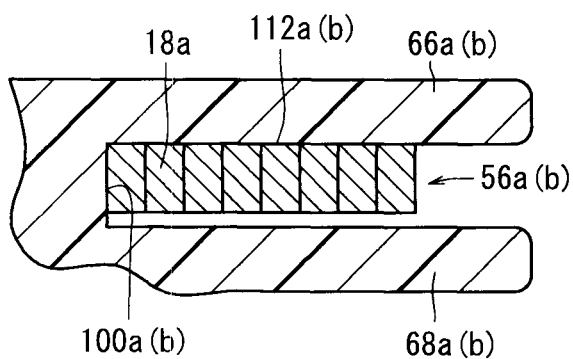

FIG. 18A shows the manner in which the terminating ends of coil strands 18a are placed in the lead end holding grooves 56a, 56b according to a guiding method of the related art wherein the coil strands 18a are not processed into an undulating shape. FIGS. 18B and 18C show the manner in which the terminating ends of coil strands 18a are placed in the lead end holding grooves 56a, 56b according to the second embodiment wherein the coil strands 18a are processed into an undulating shape.

According to the related art, as shown in FIG. 18A, since the coil strands 18a are not processed into an undulating shape, when the coil strands 18a are placed in the lead end holding grooves 56a, 56b, there are vertical gaps between the coil strands 18a in the lead end holding grooves 56a, 56b and the ledges 66a, 66b, 68a, 68b. If the divided core members 14B with such vertical gaps between the coil strands 18a in the lead end holding grooves 56a, 56b and the ledges 66a, 66b, 68a, 68b are assembled into a stator 10B, then when a rotary electric machine with such a stator is in operation, the terminating ends of the coil strands 18a tend to rub against the ledges 66a, 66b, 68a, 68b, breaking their insulation coverings.

According to the second embodiment, as shown in FIGS. 18B and 18C, since the peaks 112a, 112b apply stresses to the ledges 66a, 66b and the valleys 114a, 114b apply stresses to the ledges 68a, 68b, the terminating ends of the coil strands 18a are securely housed in an undulating shape within the lead end holding grooves 56a, 56b. Even when a rotary electric machine incorporating the stator 10B which includes the divided core members 14B vibrates while in operation, since the terminating ends of the coil strands 18a are securely retained on the ledges 66a, 66b, 68a, 68b, the terminating ends of the coil strands 18a are prevented from rubbing against the ledges 66a, 66b, 68a, 68b and hence from breaking their insulation coverings.

In FIGS. 16 through 18C, the terminating ends of the coil strands 18a are shown as being guided and placed in the lead end holding grooves 56a, 56b. The beginning ends of the coil strands 18a which are processed into an undulating shape may also be guided and placed in the other lead end holding grooves 58a, 60a, 62a, 58b, 60b, 62b for being securely positioned to safeguard themselves against frictional engagement with the ledges 66a, 66b, 68a, 68b, for obtaining the advantages same as the above case.

With the stator 10B for use in a rotary electric machine according to the second embodiment, as described above, inasmuch as the ends of the coil strands 18a are housed in an undulating shape along the circumferential directions, i.e., along the directions indicated by the arrow C, within the lead end holding grooves 56a, 58a, 60a, 62a, 56b, 58b, 60b, 62b, the peaks 112a, 112b and the valleys 114a, 114b are held in close contact with the ledges 66a, 68a, 70a, 72a, 74a, 66b, 68b, 70b, 72b, 74b and pressed against, i.e., apply stresses to, the ledges 66a, 68a, 70a, 72a, 74a, 66b, 68b, 70b, 72b, 74b. Therefore, the ends of the coil strands 18a which have been guided in the lead end holding grooves 56a, 58a, 60a, 62a, 56b, 58b, 60b, 62b are securely retained on the ledges 66a, 68a, 70a, 72a, 74a, 66b, 68b, 70b, 72b, 74b.

When a rotary electric machine incorporating the stator 10B which includes the ends of the coil strands 18a that are placed in the lead end holding grooves 56a, 58a, 60a, 62a, 56b, 58b, 60b, 62b is in operation, since the ends of the coil strands 18a are securely retained under stresses acting from the peaks 112a, 112b and the valleys 114a, 114b on the ledges 66a, 68a, 70a, 72a, 74a, 66b, 68b, 70b, 72b, 74b, the ends of the coil strands 18a are prevented from rubbing against the ledges 66a, 68a, 70a, 72a, 74a, 66b, 68b, 70b, 72b, 74b despite vibrations of the rotary electric machine and hence, e.g., from breaking their insulation coverings.

As the peaks 112a, 112b and the valleys 114a, 114b are retained on the ledges 66a, 68a, 70a, 72a, 74a, 66b, 68b, 70b, 72b, 74b, the areas of contact between the ends of the coil strands 18a and the ledges 66a, 68a, 70a, 72a, 74a, 66b, 68b, 70b, 72b, 74b are increased, and hence the surface pressure therebetween is reduced. Consequently, the ends of the coil strands 18a are prevented from being scraped off when the rotary electric machine vibrates during operation.

According to the second embodiment, as with the first embodiment, therefore, when the rotary electric machine vibrates during operation, the ends of the coil strands 18a are securely held in the lead end holding grooves 56a, 58a, 60a, 62a, 56b, 58b, 60b, 62b.

When the ends of the coil strands 18a which have been processed into an undulating shape are placed in the lead end holding grooves 56a, 58a, 60a, 62a, 56b, 58b, 60b, 62b, the peaks 112a, 112b and the valleys 114a, 114b are brought into alternate abutment against the ledges 66a, 68a, 70a, 72a, 74a, 66b, 68b, 70b, 72b, 74b. Therefore, the ends of the coil strands 18a are reliably prevented from rubbing against the ledges 66a, 68a, 70a, 72a, 74a, 66b, 68b, 70b, 72b, 74b despite vibrations of the rotary electric machine. Furthermore, the areas of contact between the ends of the coil strands 18a and the ledges 66a, 68a, 70a, 72a, 74a, 66b, 68b, 70b, 72b, 74b are increased, and hence the surface pressure therebetween is reduced, so that the ends of the coil strands 18a are prevented from being scraped off when the rotary electric machine vibrates during operation.

Each insulator 26 has the two blocks 52a, 52b spaced from each other along the directions indicated by the arrow C, and the blocks 52a, 52b have the lead end holding grooves 56a, 58a, 60a, 62a and the lead end holding grooves 56b, 58b, 60b, 62b, respectively. Therefore, when the ends of the coil strands 18a are placed in the lead end holding grooves 56a, 58a, 60a, 62a, 56b, 58b, 60b, 62b, an increased number of portions of the ends of the coil strands 18a are held in abutment against the ledges 66a, 68a, 70a, 72a, 74a, 66b, 68b, 70b, 72b, 74b. Accordingly, the ends of the coil strands 18a are securely held in the lead end holding grooves 56a, 58a, 60a, 62a, 56b, 58b, 60b, 62b.

As with the first embodiment, each of the coil strands 18a is in the form of a flat wire having a rectangular cross-sectional shape. As the ends of the coil strands 18a are guided into the lead end holding grooves 56a, 58a, 60a, 62a, 56b, 58b, 60b, 62b with the longer sides of the rectangular cross-sectional shape lying along the directions indicated by the arrow A (widthwise directions), greater stresses are applied to the ledges 66a, 68a, 70a, 72a, 74a, 66b, 68b, 70b, 72b, 74b, tending to retain the ends of the coil strands 18a on the ledges 66a, 68a, 70a, 72a, 74a, 66b, 68b, 70b, 72b, 74b, than if the shorter sides of the rectangular cross-sectional shape lie along the directions indicated by the arrow A.

With the method of manufacturing a rotary electric machine according to the second embodiment, after the ends of the coil strands 18a are processed into an undulating shape, the ends of the coil strands 18a are placed in the lead end holding grooves 56a, 58a, 60a, 62a, 56b, 58b, 60b, 62b. Therefore, the method allows the above advantages to be achieved with ease.

Figure 19:
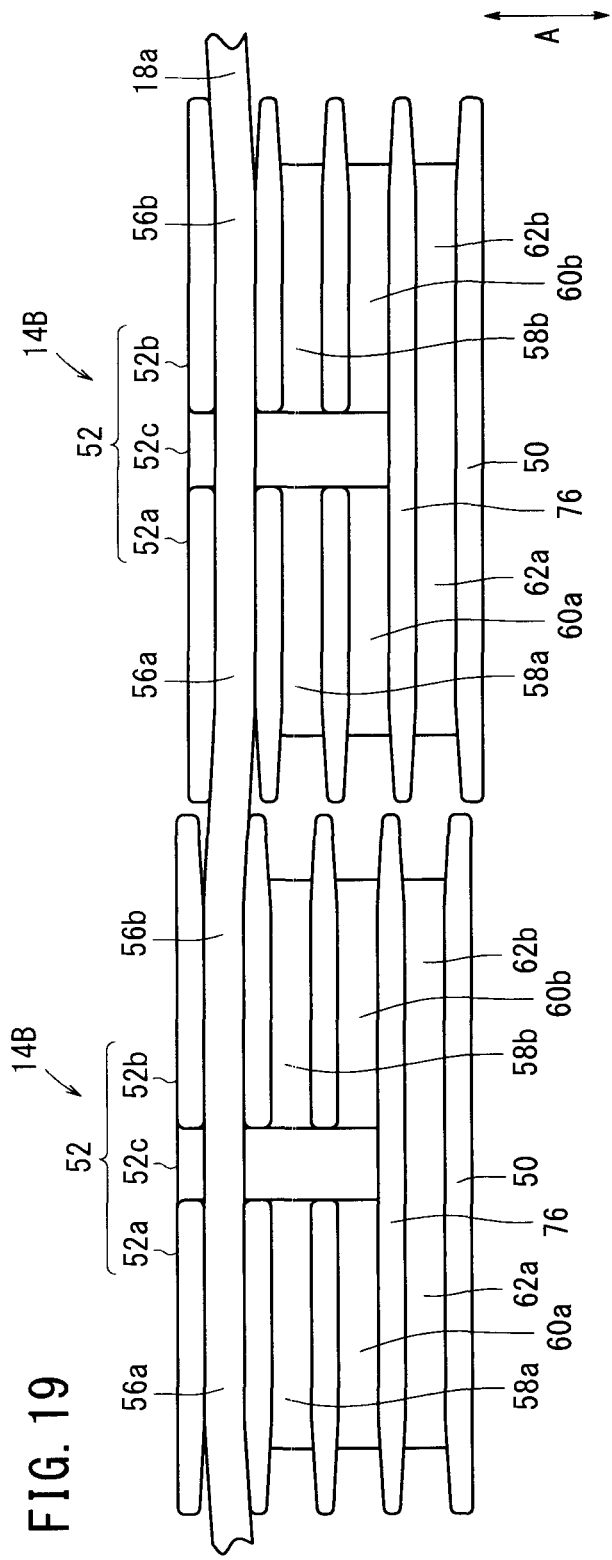
FIG. 19 is a fragmentary front elevational view schematically showing the manner in which a coil strand end is placed in lead end holding grooves according to another guiding method.

With the method of manufacturing a rotary electric machine according to the second embodiment, moreover, the ends of the coil strands 18a may be processed into an undulating shape according to a process shown in FIG. 19.

Specifically, as shown in FIG. 19, after the stator core 16B is formed, the ends of the coil strands 18a are placed in the lead end holding grooves 56a, 58a, 60a, 62a, 56b, 58b, 60b, 62b (the step of placing the end of a coil strand 18a). Then, at least one of two adjacent divided core members 14B is displaced along one of the directions indicated by arrow A, i.e., along a vertical direction as an axial direction of the stator core 16B, thereby deforming the ends of the coil strands 18a into an undulating shape along the circumferential directions of the stator core 16B (the step of processing the end of the coil strand 18a into an undulating shape).

When at least one of the divided core members 14B is displaced along one of the directions indicated by arrow A, it is possible to process the ends of the coil strands 18a into an undulating shape while they are being placed in the lead end holding grooves 56a, 58a, 60a, 62a, 56b, 58b, 60b, 62b, and keep the undulating ends of the coil strands 18a placed in the lead end holding grooves 56a, 58a, 60a, 62a, 56b, 58b, 60b, 62b. Consequently, the rollers 132, 134 with the undulating outer circumferential edges as shown in FIGS. 16 and 17 are not required, making it easy to process the ends of the coil strands 18a into an undulating shape. According to this manufacturing method, also, each of the advantages in the second embodiment can be obtained.

In the process shown in FIG. 19, the two adjacent divided core members 14B may be displaced in different directions along the directions indicated by arrow A. For example, one of the two adjacent divided core members 14B may be displaced in an upward direction whereas the other divided core member 14B may be displaced in a downward direction. According to such a modification, it is also easy to process the ends of the coil strands 18a into an undulating shape.

Although certain preferred embodiments of the present invention have been shown and described in detail, it should be understood that various changes and modifications may be made therein without departing from the scope of the appended claims.

What is claimed is:

1. A rotary electric machine comprising:
a stator having a stator core constructed of an annular array of divided core members;
wherein each of the divided core members includes a divided iron core, an insulator surrounding a portion of the divided iron core, and a coil lead wound on the divided iron core with the insulator interposed therebetween;
the insulator has a lead end holding groove defined therein at an outer circumferential surface of the stator core, for guiding an end of the coil lead therein, the lead end holding groove extending in circumferential directions of the stator core; and
the end of the coil lead is placed in an undulating shape along the circumferential directions within the lead end holding groove.

2. The rotary electric machine according to claim 1, wherein the lead end holding groove is defined by ledges, one of the ledges having a land which is convex in widthwise directions of the lead end holding groove.

3. The rotary electric machine according to claim 2, wherein one lead end holding groove is defined between two ledges, one of the two ledges has the land in the widthwise directions,
another lead end holding groove, which is circumferentially adjacent to the one lead end holding groove, is defined between two ledges, and the other of the two ledges has another land in the widthwise directions.

4. The rotary electric machine according to claim 2, wherein two lead end holding grooves are defined in the circumferential directions in the insulator.

5. The rotary electric machine according to claim 2, wherein another of the ledges has a recess which is concave in the widthwise directions, and the recess faces the land.

6. The rotary electric machine according to claim 5, wherein the land and the recess extend in depthwise directions of the lead end holding groove.

7. The rotary electric machine according to claim 2, wherein the land has a height w1 from the ledge, the end of the coil lead has a width w2, the lead end holding groove has a width w3, and the width w1 is established to satisfy the relationship:

$$w1 < (w3 = w2) < (2 \times w1).$$

8. The rotary electric machine according to claim 1, wherein the coil lead comprises a flat wire having a rectangular cross-sectional shape, and the end of the coil lead is guided in the lead end holding groove such that a longer side of the rectangular cross section lies along the widthwise directions of the lead end holding groove.

9. A method of manufacturing a rotary electric machine including a stator having a stator core constructed of an annular array of divided core members, comprising the steps of:
fitting an insulator over a divided iron core in surrounding relation to a portion of the divided iron core;
constructing the divided core member by winding a coil lead on the divided iron core with the insulator interposed therebetween;
producing the stator core by arranging a plurality of the divided core members in the annular array;
processing an end of the coil lead into an undulating shape along longitudinal directions of the coil lead; and
housing the undulating ends of coil leads in lead end holding grooves defined in the insulators at an outer circumferential surface of the stator core and extending in circumferential directions of the stator core.

10. A method of manufacturing a rotary electric machine including a stator having a stator core constructed of an annular array of divided core members, comprising the steps of:
fitting an insulator over a divided iron core in surrounding relation to a portion of the divided iron core;
constructing the divided core member by winding a coil lead on the divided iron core with the insulator interposed therebetween;
producing the stator core by arranging a plurality of the divided core members in the annular array;
housing ends of coil leads in lead end holding grooves defined in the insulators at an outer circumferential surface of the stator core and extending in circumferential directions of the stator core; and
processing the ends of the coil ends into an undulating shape along the circumferential directions of the stator core by displacing at least one of adjacent two of the divided core members along an axial direction of the stator core.

* * * * *